US012555532B2

(12) United States Patent
Nicholson et al.

(10) Patent No.: US 12,555,532 B2
(45) Date of Patent: Feb. 17, 2026

(54) OPTIMIZED PIXEL PERFORMANCE IN A DISPLAY SYSTEM

(71) Applicant: GOOGLE LLC, Mountain View, CA (US)

(72) Inventors: Stuart James Myron Nicholson, San Jose, CA (US); Gang He, Cupertino, CA (US); Edwin Lyle Hudson, San Jose, CA (US); Jeffrey Tang Fung Li, Palo Alto, CA (US); Robert Lo, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/859,775

(22) PCT Filed: Oct. 31, 2023

(86) PCT No.: PCT/US2023/036472

§ 371 (c)(1),
(2) Date: Oct. 24, 2024

(87) PCT Pub. No.: WO2025/095940

PCT Pub. Date: May 8, 2025

(65) Prior Publication Data

US 2025/0322794 A1 Oct. 16, 2025

(51) Int. Cl.

*G09G 3/20* (2006.01)
*G09G 3/3233* (2016.01)

(52) U.S. Cl.

CPC ......... *G09G 3/3233* (2013.01); *G09G 3/2081* (2013.01); *G09G 2300/0814* (2013.01);

(Continued)

(58) Field of Classification Search

CPC ............... G09G 3/3233; G09G 3/2081; G09G 2300/0814; G09G 2320/0233;

(Continued)

(56) References Cited

U.S. PATENT DOCUMENTS

| | | | |
|---|---|---|---|
| 11,574,586 | B1 | 2/2023 | Pappas et al. |
| 2006/0028686 | A1 | 2/2006 | Bergman et al. |

(Continued)

OTHER PUBLICATIONS

International Search Report and Written Opinion for PCT Application No. PCT/US2023/036472, mailed on May 15, 2024, 19 pages.

(Continued)

*Primary Examiner* — Richard J Hong
(74) *Attorney, Agent, or Firm* — Brake Hughes Bellermann LLP

(57) ABSTRACT

A display system (100) includes a memory (102) storing a set of pixel performance data entries including a first entry (104-1) associated with a first performance level of a first pixel and a second entry (104-2) associated with a second performance level of a second pixel. The display system further includes a first pixel driver (106) configured to drive the first pixel (108-1) at a first drive strength selected, based on the first entry, from a first plurality of drive strengths available to the first pixel driver. The display system also includes a second pixel driver (106) configured to drive the second pixel (108-2) at a second drive strength selected, based on the second entry, from a second plurality of drive strengths available to the second pixel driver. In a case where the second performance level is higher than the first performance level (116), the second drive strength is lower than the first drive strength (114).

20 Claims, 12 Drawing Sheets

(52) U.S. Cl.
CPC ............... *G09G 2320/0233* (2013.01); *G09G 2320/0285* (2013.01)

(58) Field of Classification Search
CPC ......... G09G 2320/0285; G09G 3/3426; G09G 3/342; H05B 45/46; G02F 1/1334
See application file for complete search history.

(56) References Cited

U.S. PATENT DOCUMENTS

| | | | | |
|---|---|---|---|---|
| 2006/0170623 | A1 | 8/2006 | Naugler et al. | |
| 2007/0229410 | A1 | 10/2007 | Yamashita et al. | |
| 2007/0285378 | A1* | 12/2007 | Lankhorst | G09G 3/342 345/102 |
| 2011/0140627 | A1* | 6/2011 | Kong | H05B 45/46 315/250 |
| 2015/0235597 | A1* | 8/2015 | Meng | G09G 3/3426 345/102 |
| 2019/0237001 | A1 | 8/2019 | Lin et al. | |
| 2022/0013600 | A1* | 1/2022 | Zhang | G02F 1/1334 |
| 2022/0157230 | A1 | 5/2022 | Suzuki | |

OTHER PUBLICATIONS

Corrigan, et al., "An Alternative Architecture for High-Performance Display", SMPTE Journal; (https://ieeexplore.ieee.org/document/7256004), Jul. 2000, pp. 568-572.

* cited by examiner

OPTIMIZED PIXEL PERFORMANCE IN A DISPLAY SYSTEM

CROSS REFERENCE TO RELATED APPLICATION

This application is a 35 U.S.C. § 371 National Phase Entry Application from PCT/US2023/036472, filed Oct. 31, 2023, designating the U.S., the disclosure of which is incorporated herein by reference in its entirety.

TECHNICAL FIELD

This description relates to image displays.

BACKGROUND

Digitally-encoded images may be presented to viewers using a variety of different types of image displays featured in a variety of different types of devices. For example, personal computing devices (e.g., laptops, tablets, etc.), mobile devices (e.g., smartphones, electronic readers, etc.), wearable devices (e.g., smart watches, etc.), extended reality devices (e.g., virtual and augmented reality headsets), televisions, and various other devices all may feature image displays configured to present images to users of the devices.

SUMMARY

Systems and methods for optimizing pixel performance in a display system are described herein. For any given array of pixels (e.g., in a panel of an image display such as those mentioned above), different pixels may perform at different levels based on a variety of factors. For example, slight differences in how each pixel is manufactured may cause one pixel to have a higher brightness efficiency level (e.g., to emit light with more intensity when driven at a particular power level) than another in the same array. As another example, different characteristics of optical devices (e.g., lenses, optical waveguides, etc.) may affect the brightness efficiency levels or other performance attributes of different pixels in a similar way. Conventional display systems generally drive each pixel with the same drive strength in spite of these differences, accounting for the disparities in a way that compromises the overall dynamic range the display systems can provide. Systems and methods described herein, on the other hand, help optimize pixel performance by accounting for these differences using a hybrid approach of digital (e.g., time/pulse width) and analog (e.g., voltage/current) modulation of controlling pixel brightness. That is, not only are pixels with different performance levels digitally driven to display different apparent brightness levels in accordance with content being displayed, but the pixels are also driven using different analog drive strengths (e.g., different voltage or current levels) to help compensate for the performance level differences. In this way, display systems employing these techniques may save power, increase dynamic range, and enjoy other significant benefits described herein.

In one implementation, an illustrative display system may include a memory configured to store a set of pixel performance data entries including: 1) a first entry associated with a first performance level of a first pixel, and 2) a second entry associated with a second performance level of a second pixel, the second performance level higher than the first performance level. The performance level of a given pixel (e.g., the first performance level of the first pixel, the second performance level of the second pixel, etc.) may be associated with an intrinsic property of the pixel (e.g., a brightness efficiency, color, response time, temperature coefficient or other such property dependent on how the pixel was manufactured), may be a property of an element interacting with the pixel (e.g., an electrical or optical element, etc.), or may be otherwise instilled within, assigned to, or associated with the pixel in any suitable way. The display system may further include a first pixel driver configured to drive the first pixel at a first drive strength selected, based on the first entry stored in the memory, from a first plurality of drive strengths available to the first pixel driver. Additionally, the display system may further include a second pixel driver configured to drive the second pixel at a second drive strength selected, based on the second entry stored in the memory, from a second plurality of drive strengths available to the second pixel driver. As the second performance level is higher than the first performance level, the second drive strength used to drive the second pixel may be lower than the first drive strength used to drive the first pixel.

In another implementation, an illustrative method may be performed by a display system. The method may comprise the steps: 1) accessing, from a memory storing a set of pixel performance data entries, a first entry of the set of pixel performance data entries, the first entry associated with a first performance level of a first pixel; 2) accessing, from the memory, a second entry of the set of pixel performance data entries, the second entry associated with a second performance level of a second pixel, the second performance level higher than the first performance level; 3) selecting, based on the first entry stored in the memory, a first drive strength from a first plurality of drive strengths available to a first pixel driver configured to drive the first pixel; 4) selecting, based on the second entry stored in the memory, a second drive strength from a second plurality of drive strengths available to a second pixel driver configured to drive the second pixel, the second drive strength lower than the first drive strength; 5) driving the first pixel at the first drive strength using the first pixel driver; and 6) driving the second pixel at the second drive strength lower than the first drive strength using the second pixel driver.

In another implementation, another illustrative method may be performed by display system. The method may comprise the steps: 1) writing a set of pixel performance data entries to a lookup table stored in a memory, the set of pixel performance data entries including: a first entry associated with a first brightness efficiency level of a first pixel, the first brightness efficiency level determined based on a first pixel efficiency characterization of the first pixel and a first characteristic of a first optical device associated with the first pixel, and a second entry associated with a second brightness efficiency level of a second pixel, the second brightness efficiency level higher than the first brightness efficiency level and determined based on a second pixel efficiency characterization of the second pixel and a second characteristic of a second optical device associated with the second pixel; 2) driving, based on the first entry of the lookup table and using a first pixel driver, the first pixel at a first drive strength selected, from a first plurality of drive strengths available to the first pixel driver, by activating a first subset of current sources from a first set of current sources available to the first pixel driver; and 3) driving, based on the second entry of the lookup table and using a second pixel driver, the second pixel at a second drive strength selected, from a second plurality of drive strengths available to the second pixel driver, by activating a second subset of current sources from a second set of current sources available to the second pixel driver, the second drive strength lower than the first drive strength.

The details of these and other implementations are set forth in the accompanying drawings and the description below. Other features will also be made apparent from the following description, drawings, and claims.

DETAILED DESCRIPTION

Figure 1:
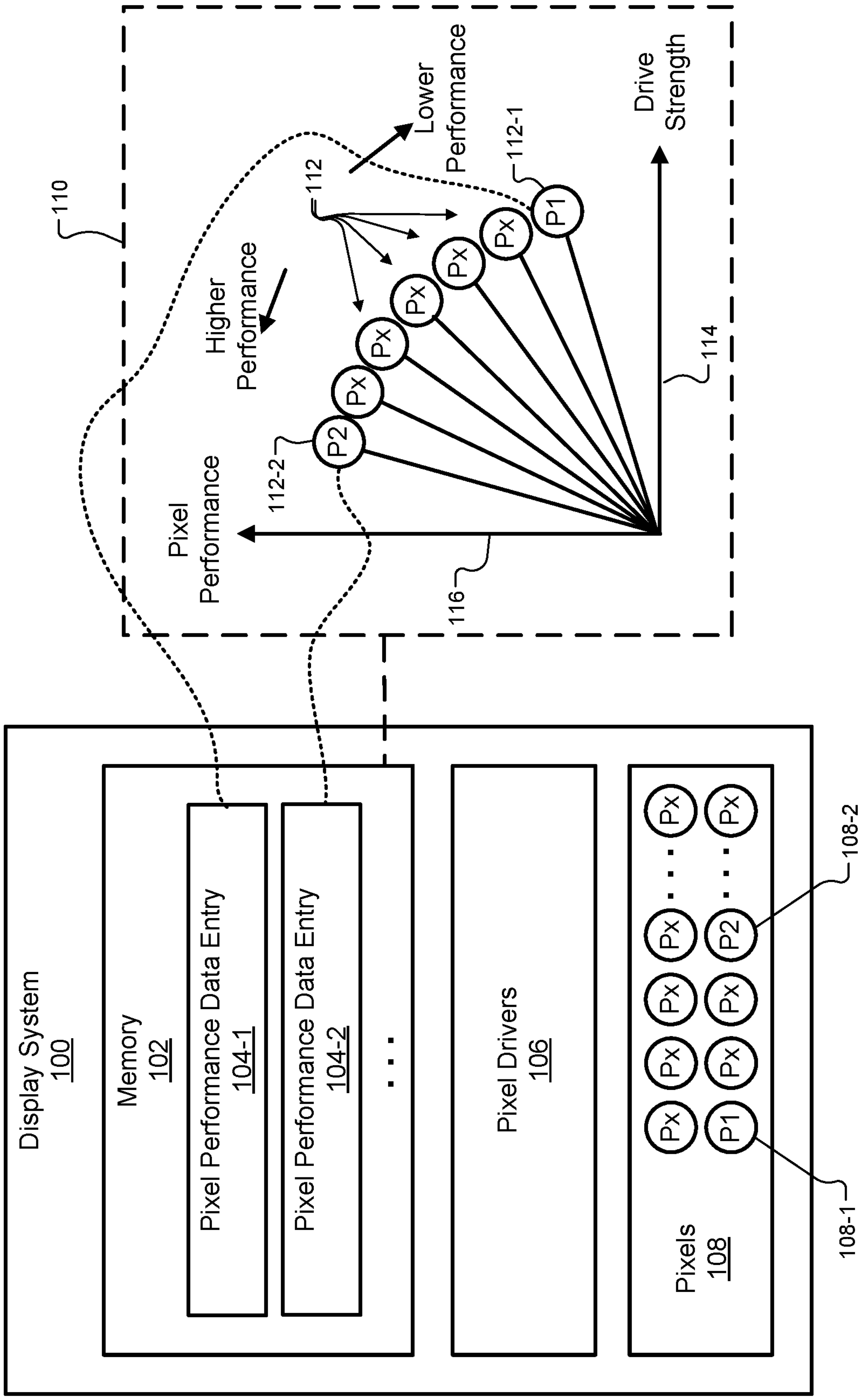
FIG. 1 shows an illustrative display system configured to optimize pixel performance in accordance with principles described herein.

Systems and methods for optimizing pixel performance in a display system are described herein. Certain emissive image displays control the brightness of different pixels by modulating the pixels rapidly on and off in accordance with the desired brightness. For example, if a particular pixel is desired to be relatively bright for a given image that is being displayed (e.g., a particular video frame being presented) that pixel will be modulated (e.g., using pulse width modulation (PWM) or another suitable time-based modulation) so as to be on (i.e., in an ON state) for much or all of the frame period and off (i.e., in an OFF state) for little or none of the frame period. Conversely, another pixel that is to be relatively dim during that frame period would be modulated to be off for a greater portion of the frame period and to be on for a shorter portion. Conventional image displays would still drive both of these pixels, however, at a same analog level (e.g., with a same voltage or current level).

Other emissive displays may be configured to control the brightness of different pixels by way of the analog levels used to drive the various pixels. For example, if a particular pixel is desired to be relatively bright, the pixel may be driven with a larger amount of current or at a higher voltage than a different pixel that is to be relatively dim. In this case however, the time modulation described above would therefore not be needed and the analog levels would typically be driven throughout the entirety of the frame period to achieve the desired effect.

The digital-only (PWM or other time modulation) and analog-only (current/voltage value modulation) approaches described above allow for a range of brightness levels by various pixels so that an image can be displayed. However, as will be described in detail herein, further optimization of pixel performance is achievable by using a hybrid of these approaches (referred to herein as a hybrid approach or a hybrid digital/analog approach).

A hybrid approach employed by systems and methods described herein is configured to account for differences in pixel performance that, unlike the different brightness levels described above, may be largely or entirely independent of the content being displayed. Pixel performance may vary from pixel to pixel with respect to various performance aspects and for various reasons. For instance, many examples described herein explicitly or implicitly refer to a brightness or intensity aspect of pixel performance (e.g., a brightness efficiency that determines how much light a given pixel emits light when driven at a certain level). Other aspects of pixel performance that may be similarly handled based on principles described herein include, without limitation, a color performance aspect (e.g., relating to wavelength produced by a pixel given a particular input), a response time aspect (e.g., relating to how quickly a pixel responds to input stimulus), a temperature coefficient aspect (e.g., relating to how temperature affects the performance of a pixel), and other suitable aspects. Certain aspects of pixel performance may be associated with intrinsic differences between pixels (e.g., as a result of manufacturing or other processes that cause slight variation between pixels). Additionally, the same or other aspects of pixel performance may be associated with the context in which pixels are employed. For example, an optical device (e.g., lens, waveguide, etc.) associated with (e.g., assigned to) one pixel may attenuate light emitted by that pixel more than the optical device associated with another pixel in the same panel.

Systems and methods described herein for optimizing pixel performance in a display system with widely varying pixel performance and behavior (e.g., a micro-LED display, an LCOS display, etc.) may account for these and other such performance differences (e.g., content-agnostic, relatively permanent differences between pixels) using the hybrid approach. For example, these display systems may use different drive strengths for pixels having different performance levels (to at least partially equalize these performance differences using different analog levels to drive the pixels) while relying on time modulation (e.g., PWM, etc.) to implement content-specific brightness disparities from frame to frame (as well as to complement and make up for performance disparities that may not be fully or precisely addressed by the different analog values).

A technical problem faced by virtually all image displays involves the challenge of using power as efficiently as possible. Depending on the application and the type of device in which a display system is implemented, the power consumption of the image display may indeed be a significant design consideration and/or constraint. In particular, while it is generally desirable for all electronic devices to operate as efficiently as possible, certain types of devices may be especially sensitive to the technical problem of consuming power inefficiently. For example, the overall battery life of battery-powered devices may be a significant consideration of consumers looking to purchase such devices and the experience that a device is configured to provide (i.e., capable of providing) may depend greatly on how effectively and how long the device can perform given a certain amount of battery charge.

Another technical problem faced by many display systems is how to optimize characteristics such as dynamic range without significantly compromising other design objectives (e.g., power consumption, complexity, portability, component cost, etc.). An image display with a large dynamic range is capable of displaying a wide range of different brightness values so as to present images with sharp contrasts (e.g., dark blacks, vivid colors, etc.). The amount of dynamic range used by a particular pixel is determined by how many different brightness values particular pixel is capable of producing, which generally corresponds to a number of bits used to encode the brightness value for the pixel. However, the dynamic range for pixels that have different performance levels may be skewed in a way that reduces the overall dynamic range for the entire panel. For example, one highly efficient pixel may lose dynamic range on the low end since even a small portion of time in the pulse-width modulation scheme may result in a relatively high apparent brightness, while a less efficient pixel may lose dynamic range on the high end since a large portion of time may be needed in the pulse width modulation scheme to achieve a desired apparent brightness.

Systems and methods described herein for optimizing pixel performance in a display system provide technical solutions for these technical problems and more. Specifically, a technical solution to the challenge of optimizing power arises by using relatively small drive strengths (which are associated with less power than larger drive strengths) to drive pixels that have suitably high performance levels. The relatively high drive strengths that a conventional display system might rely on to power all the pixels in a panel may therefore be reserved only for pixels whose performance levels (e.g., brightness efficiency) merit such a drive strength and are well served by it. A technical solution to the challenge of optimizing dynamic range arises by at least partially equalizing (e.g., centering, reducing the skew or performance disparities between) pixels that perform at different levels. For example, by reducing the analog drive strength of the relatively efficient pixel described above, a larger amount of the bit space of its brightness value may be dedicated to the low end to differentiate dim intensity levels (providing a more attractive picture for content with lots of dark colors). At the same time, increasing the analog drive strength of the relatively inefficient pixel (at least relative to the efficient one) allows more of the bit space of its brightness value to be dedicated to the high end to differentiate bright intensity levels. The technical effect of these solutions is that image displays employing the principles described herein may provide a crisp and attractive reproduction of desired content even while still being highly efficient in terms of power, heat, complexity, and so forth.

Other technical problems that may be present in certain conventional systems and that may be addressed by technical solutions arising from systems and methods described herein may include at least: increased power consumption from higher drive levels of low performing pixels, increased quantization errors due to the increased performance step size if the PWM bit depth is unchanged as drive levels increase, increased power consumption to achieve the high switching speeds required for high dynamic range PWM, additional environmental sensitivity arising from analog modulation (which may require additional calibration), higher input bandwidth requirements for data from the image source (e.g., to provide suitable bit depth for desired dynamic range), additional memory required to store the high dynamic range data from the data source, and so forth. In some cases, these problems lead to higher power consumption, interface complexity (e.g., in the event that pixel performance variation is limited to certain colors or is more pronounced for some colors than others), image source processing requirements, and other issues, all of which may be at least partially alleviated or improved using systems and methods for optimizing pixel performance described herein. Moreover, these solutions may be achieved without changing the interface to the image source, thereby not increasing system complexity in normal operation (e.g., after a calibration procedure has been performed to write a lookup table with pixel performance data entries described in more detail below).

Various implementations will now be described in more detail with reference to the figures. It will be understood that the particular implementations described below are provided as non-limiting examples and may be applied in various situations. Additionally, it will be understood that other implementations not explicitly described herein may also fall within the scope of the claims set forth below. Systems and methods for optimizing pixel performance in a display system may result in any or all of the technical benefits mentioned above, as well as various additional technical benefits that will be described and/or made apparent below.

FIG. 1 shows an illustrative display system 100 configured to optimize pixel performance in accordance with principles described herein. As shown, display system 100 includes a memory 102 that includes a pixel performance data entry 104-1 (entry 104-1), a pixel performance data entry 104-2 (entry 104-2), and other pixel performance data entries not explicitly shown (represented by an ellipsis). Collectively, these pixel performance data entries may be referred to as entries 104. Display system 100 further includes a set of pixel drivers 106 and a set of pixels 108. As shown, certain specific pixels are shown as circular objects labeled “Px.” A particular pixel 108-1 is labeled “P1” and another pixel 108-2 is labeled “P2.” These pixels will be singled out in the following description below for illustrative purposes, but it will be understood that display system 100 may include an array of any suitable number of pixels 108, and that pixels 108-1 and 108-2 may represent any arbitrary pixels within this array that meet the criteria that will be described. Each of the elements of display system 100 will now be described in more detail.

Memory 102 may include any transitory or non-transitory data storage structure that is configured to store a set of pixel performance data entries such as entries 104. For example, memory 102 may be implemented as a set of rewritable hardware registers, as a read-only memory, as random-access memory, NAND memory, solid state storage, or any other suitable form of data storage. In some implementations, memory 102 may include a read-only lookup table into which each entry 104 (including the first entry 104-1 and the second entry 104-2) are permanently encoded at a time of manufacture of display system 100. For example, for certain display systems intended for off-the-shelf use without significant optical or other modifications that would benefit from customized calibration, the permanent encoding of the read-only lookup table at the time of manufacture may provide certain conveniences. In other implementations, memory 102 may include a reconfigurable lookup table into which each entry 104 (e.g., including the first entry 104-1 and the second entry 104-2) are entered (i.e., written) based on calibration performed subsequent to a manufacture of the display system. For example, for display systems intended to be integrated with optical devices that are out of the control of the manufacturer of the display system and that will have an appreciable effect on the performance of various pixels 108, the calibration subsequent to manufacture may help ensure that optimal and accurate pixel performance data is entered into the reconfigurable lookup table. In some cases, periodic calibration and associated rewriting or updating of the reconfigurable lookup table may be performed.

As indicated by a dashed line connecting memory 102 and a pixel performance graph 110, pixel performance data entries 104 may be associated with (e.g., storing information indicative of) performance levels of various pixels 108. For example, as illustrated by dotted lines connecting entries 104 to circular pixels on performance graph 110, pixel performance attributes of each pixel 108 may be analyzed and determined to be different. As shown, for instance, a first entry (e.g., entry 104-1) associated with a first performance level (e.g., a performance level 112-1) of a first pixel (e.g., pixel 108-1) may be stored in memory 102 along with a second entry (e.g., entry 104-2) associated with a second performance level (e.g., a performance level 112-2) of a second pixel (e.g., pixel 108-2).

As has been mentioned, different pixels may have different performance levels for a variety of reasons such as, for example, manufacturing differences, optical disparities arising from different optical devices (e.g., lenses, waveguides, etc.) with which the pixels are associated, and so forth. Accordingly, a calibration procedure may be performed to determine the performance levels of each pixel 108 and these performance levels may be memorialized in the lookup table of memory 102. For example, each performance level 112 (including the first performance level 112-1 and the second performance level 112-2) may be a brightness efficiency level that is determined based on a pixel efficiency characterization (e.g., a first pixel efficiency characterization of the first pixel, a second pixel efficiency characterization of the second pixel, etc.) performed as part of the calibration. As another example, each performance level (e.g., again including the first performance level 112-1 and the second performance level 112-2) may be a brightness efficiency level that is determined based on one or more characteristics of an optical device associated with the pixel (e.g., a first characteristic of a first optical device associated with the first pixel, a second characteristic of a second optical device associated with the second pixel, etc.), the characteristics also being identified as part of the calibration. In some implementations, both the optical device characteristics and the pixel efficiency characterizations (which may identify inherent disparities between pixels, such as caused by manufacturing processes) may be identified as part of a calibration procedure and integrated into a single value for each pixel to be entered or written into the lookup table of memory 102.

To illustrate, various performance levels 112 (including the particular performance levels 112-1 and 112-2) are plotted on performance graph 110 with respect to a drive strength 114 (on the x-axis) and a pixel performance 116 (on the y-axis). For example, this pixel performance 116 may be associated with the brightness of the pixel, such that performance levels 112 of the various pixels represent brightness efficiency levels of the pixels, or, in other words, how brightly the pixels emit energy per unit of drive strength 114. As indicated by arrows and labels on the graph, pixels with performance levels 112 that require relatively high drive strength 114 for relatively low pixel performance 116 (e.g., such as performance level 112-1) will be understood to be relatively inefficient and to have relatively low performance levels ("Lower Performance"). Conversely, pixels with performance levels 112 that provide relatively high pixel performance 116 with relatively modest drive strength 114 (e.g., such as performance level 112-2) will be understood to be relatively efficient and to have relatively high performance levels ("Higher Performance"). Accordingly, for this example, performance graph 110 illustrates that the second performance level 112-2 is higher than the first performance level 112-1. Values representative of these attributes (performance levels 112) may be stored as entries 104 in a lookup table included in or implemented by memory 102 to be used in ways that will be described.

The set of pixel drivers 106 may be configured to use incoming image data (not explicitly shown) and pixel performance data stored in memory 102 (e.g., entries 104) to cause the set of pixels 108 to display images for certain time periods (e.g., frame times associated with each image or frame). For example, a first pixel driver 106 may be configured to drive a first pixel (e.g., pixel 108-1) at a first drive strength selected, based on the first entry (e.g., entry 104-1) stored in memory 102, from a first plurality of drive strengths available to the first pixel driver. Similarly, a second pixel driver 106 may be configured to drive a second pixel (e.g., pixel 108-2) at a second drive strength selected, based on the second entry (e.g., entry 104-2) stored in memory 102, from a second plurality of drive strengths available to the second pixel driver. As a result of the second performance level 112-2 being higher than the first performance level 112-1, this second drive strength at which the second pixel driver 106 drives the second pixel 108-2 may be lower than the first drive strength at which the first pixel driver 106 drives the first pixel 108-1. For instance, in certain implementations, the second drive strength may be selected to be lower than the first drive strength based on the second performance level being higher than the first performance level. Examples of the available drive strengths and how they may be selected by a particular pixel driver 106 based on a pixel performance data entry 104 will be described in more detail below.

As has been described, the set of pixels 108 may be driven by pixel drivers 106 in any of the ways described herein. When properly driven in accordance with principles described herein, pixels 108 may collectively emit light that reproduces an image.

Figure 2A:
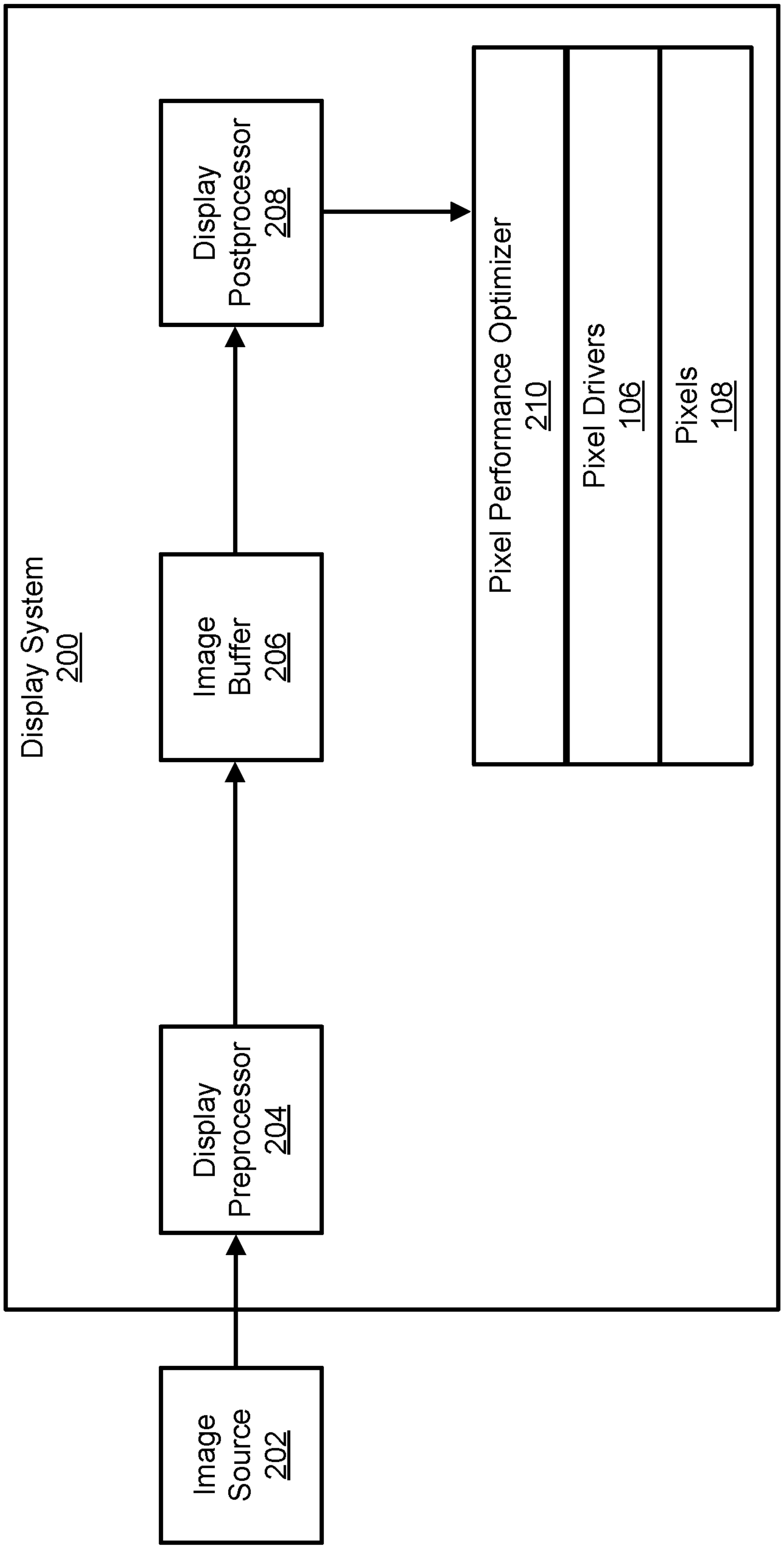
FIG. 2A shows an illustrative implementation of the display system of FIG. 1 in accordance with principles described herein.
Figure 2B:
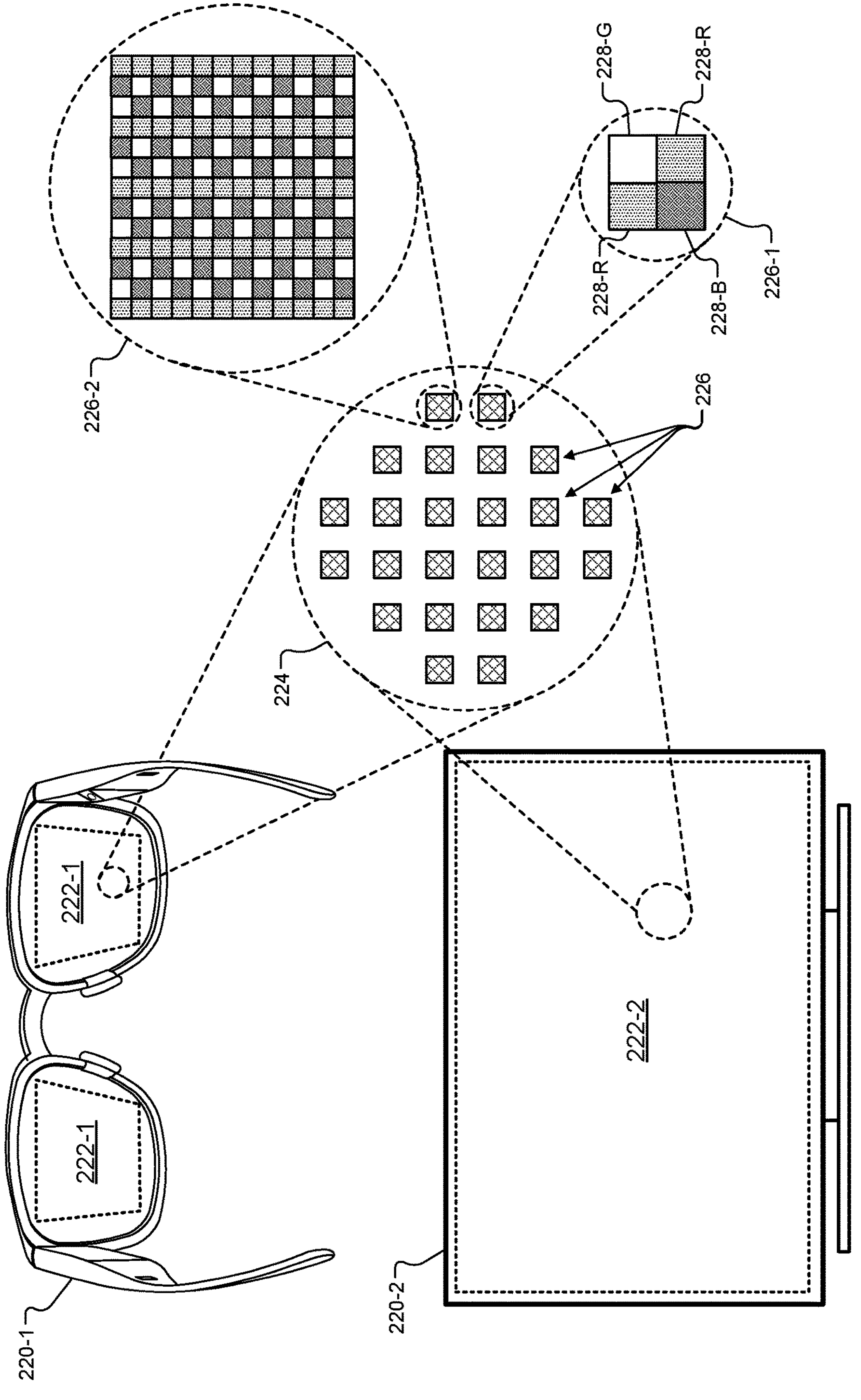
FIG. 2B shows certain aspects of various example image displays that may be implemented by the display system of FIG. 1 in accordance with principles described herein.
Figure 2C:
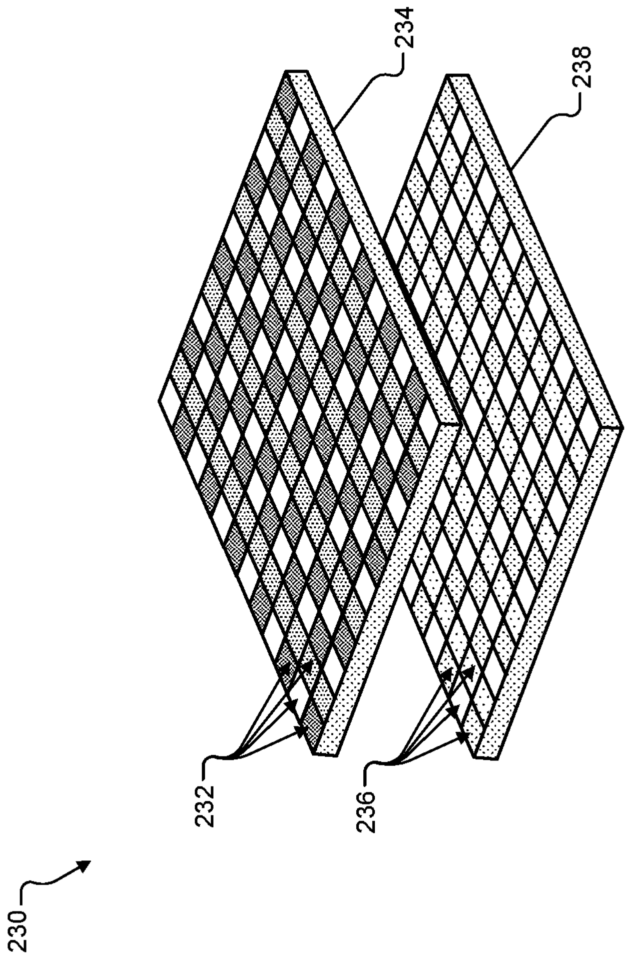
FIG. 2C shows certain aspects of an example image display that may be implemented by the display system of FIG. 1 in accordance with principles described herein.

Systems and methods described herein for optimizing pixel performance (e.g., including display system 100) may be implemented by various types of display systems and in connection with various display technologies. FIGS. 2A-2C will now be described to show examples of such display systems in operational contexts and to set forth certain technologies that may come into play in the implementations of these display systems. More specifically, FIG. 2A shows an illustrative implementation of display system 100, while FIGS. 2B and 2C show certain technological aspects of example image displays that may be implemented by display system 100 in accordance with principles described herein.

In FIG. 2A, a display system 200 receiving image data from an image source 202 will be understood to represent an illustrative implementation of display system 100. As shown, display system 200 includes a display preprocessor 204 that receives the image data from image source 202, an image buffer 206, a display postprocessor 208, and a pixel performance optimizer 210 that directs the set of pixel drivers 106 and corresponding set of pixels 108 (both described above) to provide various technical benefits and advantages described herein.

Display system 200 may implement image displays that may be featured in a variety of different types of electronic devices. For example, relatively large image displays implemented by display system 200 may be included in devices such as personal computers (e.g., laptops, desktop monitors, etc.) and televisions, smaller image displays implemented by display system 200 may be included in devices such as mobile devices (e.g., smartphones, tablets, electronic reading devices, etc.), and even smaller image displays implemented by display system 200 may be included in devices such as smart watches, augmented reality glasses (or other extended reality headsets), or other wearable or ultra-portable devices.

FIG. 2B shows certain aspects of a few such image displays that may be implemented by a display system such as display system 200 (which itself is an implementation of display system 100).

A first illustrative device 220-1 is shown to be implemented as a pair of augmented reality glasses that is configured to display content on a pair of display panels 222-1 associated with the lenses of the glasses. While not explicitly shown in FIG. 2B, it will be understood that an implementation of display system 200 may be built into the frames of device 220-1 (e.g., on the temple of the glasses or within the bridge, rims, or end pieces of the glasses, etc.) and waveguides built into the lenses may carry emitted light to be displayed to the user in front of his or her eyes on display panels 222-1. In this type of example, the display system serves as a heads-up display system that is configured to pass through a view of a surrounding environment for any subset of pixels (from the total set of all available pixels) not being driven during any particular time period.

A second illustrative device 220-2 is shown to be implemented as a television or computer monitor that is configured to display content on a screen 222-2. In this type of display device, the implementation of display system 200 may be built into a chassis of the television or computer monitor (e.g., behind screen 222-2). While screen 222-2 is shown to be a rectangular viewing panel (as may be typical for this type of display device), it will be understood that image displays may come in a variety of shapes, including certain shapes that are non-rectangular, disjointed (i.e., multi-part), multi-dimensional (rather than a 2D array of pixels), and so forth. For example, display panels 222-1 illustrate a non-rectangular image display example.

A circular display sample 224 shown to either be from a display panel 222-1 or from screen 222-2 is illustrated to include a plurality of picture elements referred to as pixels 226. As mentioned above, it will be understood that the hardware for these picture elements (e.g., implementations of pixels 108 described above) may be implemented in any suitable location such as on the frame of the glasses device 220-1 or behind the screen of television device 220-2. Regardless of this detail, however, the viewer using either of these devices may perceive pixels 226 of sample 224 at the locations shown on the display panel 222-1 and/or the screen 222-2, though it will be understood that sample 224 is not necessarily drawn to scale.

Pixels 226 may be organized or positioned into an N×M array, with N being the number of rows of picture elements in the array and M being the number of columns of picture elements in the array. For small image displays, examples of array sizes (N, M) may be (10, 10), (100, 100), or the like, with each pixel 226 in the array having itself an array or grid of light emitting elements 228 (e.g., light emitting elements 228-R, 228-G, and 228-B, which will be described in more detail below and may also be referred to as "pixels" corresponding to particular color components of the larger pixel 226). For larger image displays, examples of array sizes may include (500, 500), (1000, 1000), (5000, 5000), (10000, 10000), or the like, again with each pixel 226 in the array having itself an array or grid of light emitting elements 228. In some implementations, N and M may be different (to form a rectangular, non-square array such as a 1080×1920 full high-definition array or another array of a standard resolution). Alternatively, as mentioned above, the array may be of a different, non-rectangular shape.

Pixels 226 in sample 224 may be implemented in any suitable way and/or by any suitable number of light emitting elements 228 (i.e., color-specific pixel components). Two particular examples of pixels 226 are shown in FIG. 2B as pixel 226-1 and pixel 226-2. It will be understood, however, that each pixel 226 in a given display would be similar or identical and that the specific examples of pixels 226-1 and 226-2 would generally be employed in different image displays.

In pixel 226-1, FIG. 2B shows an example of a pattern or mosaic of light emitting elements 228-R (a red pixel component), 228-G (a green pixel component), and 228-B (a blue pixel component). In this example, a portion of an array or grid of light emitting elements 228 that are part of a pixel is enlarged to show one particular pattern that may be used to implement a single pixel 226 (i.e., pixel 226-1 in this case). Specifically, this example shows three different types of light emitting elements 228 that each produce light of different colors, such as red light, green light, and blue light, for example. In some implementations, the pattern can include (as shown) twice as many light emitting elements that produce red light (i.e., light emitting elements 228-R) than those that produce green light (light emitting elements 228-G) or blue light (light emitting elements 228-B). In other implementations, the pattern could include a light emitting element that produces red light that is twice a size of those that produce green light or blue light (not shown), or a fourth type of light emitting element that produces light of fourth color (e.g., white light). Generally, the area of light emitting elements of one color can be varied relative to the area of light emitting elements of other color(s) to meet particular color gamut and/or power efficiency needs. The patterns and colors described in connection with FIG. 2B are provided by way of illustration and not of limitation. A wide range of patterns and/or colors (e.g., to enable a specified color gamut in the display) may be available for the light emitting elements of a picture element. In certain implementations, additional light emitting elements (of any color) may be used in a particular pattern to provide redundancy.

For certain types of displays (e.g., light field displays), a single pixel 226 (e.g., sometimes referred to as a super-raxel in the context of light field displays) may include a larger array of light emitting elements than the four shown in the example of pixel 226-1. These light emitting elements may be monolithically integrated onto a same semiconductor substrate. For example, when the different types of light emitting elements are based on different materials (or different variations or compositions of the same material), each of these different materials may be compatible with the semiconductor substrate such that the different types of light emitting elements 228 (e.g., light emitting elements 228-R, 228-G, and 228-B) may be monolithically integrated with the semiconductor substrate. This may enable ultra-high-density arrays of light emitting elements 228 that are useful for ultra-high resolution image displays, extremely small image displays (such as implemented within a frame of a glasses device 220-1), light field displays, or the like.

An enlarged view of pixel 226-2 is shown in FIG. 2B to include an array of light emitting elements similar to the light emitting elements 228 described above in relation to pixel 226-1, only with more elements. The array of light emitting elements of pixel 226-2 may be a P×Q array, with P being the number of rows of light emitting elements in the array and Q being the number of columns of light emitting elements in the array. Examples of array sizes (P, Q) may include (5, 5), (10, 10), (12, 12), (20, 20), (25, 25), or the like. It will be understood that these sizes are given only as examples, and the array of light emitting elements for a given picture element need not be limited to square or rectangular shapes and can be based on a hexagonal shape or other suitable shapes instead.

For each pixel 226 implemented in the form of pixel 226-2, the light emitting elements in the array may include separate and distinct groups of light emitting elements, allocated or grouped (e.g., logically grouped) based on spatial and angular proximity, so as to produce different light outputs (e.g., directional light outputs that contribute to produce light field views).

Returning to FIG. 2A, a suitable image source 202 may provide image data to display system 200 in any manner as may serve the particular type of display system that is implemented. For example, image source 202 may provide video data representing a particular movie or television show for a display system 200 implemented as a television (e.g., device 220-2), while image source 202 may provide information about augmentations to be overlaid onto the external environment for a display system 200 implemented as augmented reality glasses (e.g., device 220-1).

Display preprocessor 204 and display postprocessor 208 may each be implemented as any processor, microprocessor, custom circuitry, hardwired digital logic, or the like (or combination of these) as may serve a particular implementation. Display preprocessor 204 may be configured to perform operations on the image data after the image data is received from image source 202 and before the image data is buffered by image buffer 206. Display postprocessor 208 may be configured to then perform operations on the image data after the image data has been buffered by image buffer 206 and before the image data is sent to pixel performance optimizer 210 for use in directing pixel drivers 106 to drive pixels 108. The operations performed on the image data by display preprocessor 204 and/or display postprocessor 208 may include any suitable image processing operations, performed in any order as may serve a particular implementation. For instance, in various implementations the operations performed by display preprocessor 204 and/or display postprocessor 208 may include, without limitation, color correction operations, data translation operations (e.g., to transform the image data into a form more appropriate for the display technology being used), data compression and/or decompression operations, color reformatting operations (e.g., to convert from one color format to another, etc.), bit depth operations (e.g., to adjust the dynamic range of the data to better match the capabilities of the image display), and other image or color processing operations.

Image buffer 206 may be implemented as a set of memory (e.g., data registers, NAND memory, etc.) configured to store a certain amount of image data. In certain implementations, for example, image buffer 206 may include sufficient memory to store one or more entire frames of image data. In other implementations, image buffer 206 may lack sufficient memory to store an entire frame at once. For instance, image buffer 206 may include sufficient memory only to buffer data associated with a certain number of pixels (e.g., one row's worth of pixels, a portion of a row, a block of contiguous rows, etc.), rather than an entire frame at a time.

Pixel drivers 106 may be implemented as any suitable circuitry configured to translate digital image data into an analog signal (e.g. a voltage, a current) that the pixel drivers may use to drive pixels 108. Based on such analog signals driven by the pixel drivers 106, pixels 108 may then convert the electrical energy into optical energy (i.e., light). In some implementations, pixel drivers 106 may associate with pixels on a one-to-one basis. That is, one pixel driver 106 in the set of pixel drivers may be associated with one pixel 108 (one pixel color component in certain implementations), a different pixel driver 106 in the set of pixel drivers may be associated with another pixel 108 (another pixel color component in certain implementations), and so forth. In other implementations, pixel drivers 106 may be configured to drive pixels in a row/column scheme by, for example, activating horizontal and vertical lines associated with the pixels (e.g., activating a particular row by a row driver, activating a particular column by a column driver, etc.).

As mentioned above, some display panels may implement pixel drivers 106 such that they provide analog values (e.g., voltages or currents with a range of possible values) to drive the respective pixels 108 (e.g., higher values of voltage or current to drive pixels brighter, lower values of voltage of current to drive pixels dimmer, etc.). Other display panel implementations may configure pixel drivers 106 to control the brightness of pixels 108 by means other than analog values. For example, a pulse-width modulation (PWM) scheme may be employed to use time as the varying value that controls the brightness of each pixel or pixel component. In this type of example, a set value of voltage or current may be turned on and off rapidly (e.g., over several cycles per frame time period) to create an effect of the pixel being at maximum brightness (on for the entire time period), at minimal brightness (on for only one cycle during the time period, off for the remainder), or somewhere in between (on for more than one cycle but off for at least one). As mentioned above and as will be described in more detail below, a hybrid approach using both analog values that vary from pixel to pixel and PWM signals that alter the brightness of each pixel from frame to frame may be employed in connection with principles described herein.

As suggested by the adjacent rectangles depicting the sets of pixel drivers 106 and pixels 108 in FIG. 2A, pixels 108 may be arranged in a two-dimensional plane and pixel drivers 106 may be positioned directly behind the pixels 108, such that each pixel (or, more particularly, each pixel component of the various colors red, green, and blue) may be driven by an adjacent, corresponding pixel driver.

To illustrate, FIG. 2C shows an exploded view 230 of a grid (or array) of pixel components 232 (e.g., similar to light emitting elements 228-R, 228-G, and 228-B described above) disposed on a pixel plane 234. Directly behind pixel plane 234, a corresponding grid of pixel drivers 236 is shown to be disposed on a driver plane 238, with pixel drivers 236 corresponding to pixel components 232 on a one-to-one basis. It will be understood that appropriate optics (not explicitly shown in FIG. 2C) may then be arranged on the other side of pixel plane 234 to facilitate the light emitted by each pixel component to travel to the eyes of viewers in a desirable way. For example, lenses, light guides, diffractive gratings, and/or other suitable optical devices may be employed as may serve a particular implementation.

As shown (and as mentioned above), multiple pixels (and pixel element components) may be monolithically integrated on a same semiconductor substrate. That is, multiple pixels can be fabricated, constructed, and/or formed from one or more layers of the same or different materials disposed, formed, and/or grown on a single, continuous semiconductor substrate. While the example shown in FIG. 2C shows a portion of a large, monolithic array of pixel components, however, it will be understood that other implementations may involve more limited arrays of pixel components (e.g., a single pixel such as pixel 226-1 with four pixel components) or even monochrome pixels that include only a single pixel component on a semiconductor substrate (e.g., discrete LEDs or the like).

Figure 3:
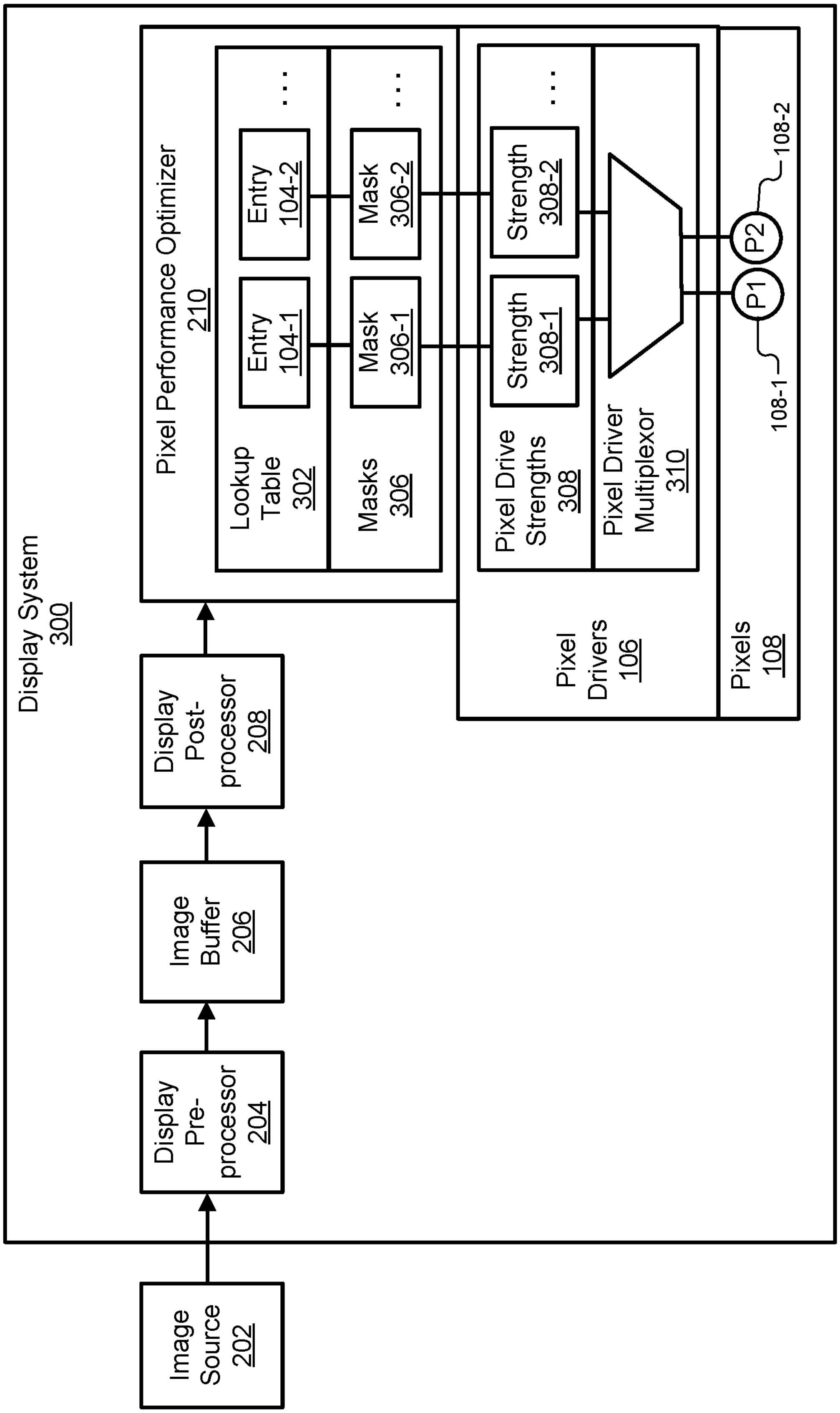
FIG. 3 shows another illustrative implementation of the display system of FIG. 1 in accordance with principles described herein.

As has been described, display systems and methods for optimizing pixel performance in accordance with principles described herein may provide technical benefits such as increased power efficiency and dynamic range, reduced complexity and memory requirements, and other resource efficiencies. To further illustrate how these efficiencies and technical solutions may be implemented, FIG. 3 shows a display system 300, which will be understood to represent, like display systems 100 and 200 described above, another display system implementing optimized pixel performance principles described herein. Similar to display system 200 described in relation to FIG. 2A, display system 300 is shown to receive image data from image source 202, and to perform image data processing using both a display preprocessor 204 and a display postprocessor 208 that immediately precede and follow image data buffering (temporary storage) by an image buffer 206.

In display system 300, however, additional detail is shown for the implementations of pixel performance optimizer 210, the set of pixel drivers 106, and the set of pixels 108. Certain aspects illustrated by these additional details will now be described.

Pixel performance optimizer 210 is shown to include a lookup table 302 that includes various pixel performance data entries such as the entries 104 described above. For example, lookup table 302 may be included within a memory such as memory 102 (not explicitly shown in FIG. 3) so that the various entries 104, including entry 104-1 and 104-2 that were specifically describe above in relation to FIG. 1, may be written, stored, and accessed in furtherance of the pixel performance optimization described herein. As with the entries 104 shown in memory 102 above, it will be understood that the particular pixel performance data entries 104 explicitly shown in lookup table 302 (i.e., entries 104-1 and 104-2) may be included among a large set of such entries (e.g., one per pixel or pixel element in certain implementations), as indicated by the ellipsis in lookup table 302.

The pixel performance data represented in the various entries 104 of lookup table 302 may be determined as part of a calibration or system characterization process such as have been described, and, as such, may account for manufacturing differences between pixels, optical effects of different optical devices (or different parts of an optical device) with which the pixels are associated, and so forth. The lookup table design may be configured to easily accommodate varying dynamic ranges between different colors as some colors may require more bits to achieve maximum performance. For instance, any variability may be transparent to the image source and may require no additional continuous bandwidth (though some bandwidth will be required upon display startup to initialize the lookup table).

Pixel performance optimizer 210 is further shown to include a set of masks 306 associated with lookup table 302. Specifically, FIG. 3 shows a mask 306-1 corresponding with entry 104-1, a mask 306-2 corresponding with entry 104-2, and an ellipsis representing various other masks that may be included for the various other pixels (pixel elements) in the system. As will be described and illustrated in more detail below, the set of masks 306 may serve to select between different available drive strengths for a given pixel 108 (e.g., different drive strengths available to a pixel driver 106 driving that pixel 108) so that, however the pixel is controlled digitally (e.g., turned on and off in accordance with a PWM signal, etc.), the pixel is driven using an optimized analog value that helps center the pixel's dynamic range based on its performance (as represented by its respective entry 104 in lookup table 302). For example, if entry 104-1 indicates that a first pixel is relatively inefficient (low performing), mask 306-1 may be configured to cause a relatively high drive strength to be used when the first pixel is driven. Similarly, if entry 104-2 indicates that a second pixel is relatively efficient (high performing), mask 306-2 may be configured to cause a relatively low drive strength to be used when the second pixel is driven.

Masks 306 may be implemented in any manner as may serve a particular implementation. For a binary PWM system, for instance, the pixel performance data of lookup table 302 may be interpreted as mask bits that select which of M drives (e.g., current sources) may be activated simultaneously when the display postprocessor 208 (e.g., which may be providing a PWM signal) determines that a pixel should be turned on. This allows N bits of lookup table data for a given color to select any one of 2^N drive strengths when that pixel is to be turned on by turning on one or more drives whose outputs can then be combined (summed) by a multiplexor (as described below). While this type of approach may be the primary focus of the following description, it will be understood that other suitable masking, drive strength, and multiplexing approaches may also be employed in other implementations. For example, in an analog modulation system, the lookup data could select from a palette of offsets and scaling factors that would be applied to the post-processed image data to modulate a selected drive to a level appropriate for the pixel performance.

Additional detail shown in FIG. 3 for pixel drivers 106 includes that each pixel driver 106 for a given pixel 108 may have selected a custom pixel drive strength 308 (e.g., a drive strength 308-1 for the first pixel 108-1 associated with entry 104-1 and mask 306-1; a drive strength 308-2 for the second pixel 108-2 associated with entry 104-2 and mask 306-2; etc.). As has been mentioned and as will be illustrated and described in more detail below, each custom pixel drive strength 308 used to drive a pixel 108 may be selected from a plurality of drive strengths that may be available to a given pixel driver 106. For example, each pixel driver 106 may include several current sources that can be activated or deactivated in accordance with pixel performance (e.g., based on the pixel performance data entry for that pixel and using the mask to accomplish the activation/deactivation). The drive strengths 308-1 and 308-2 shown in FIG. 3 would therefore represent certain combinations of these current sources (combinations selected based on the entries 104 and masks 306). Pixel driver multiplexor 310 may then perform any additional work needed to deliver the selected pixel drive strength 308 to the respective pixel 108 as may serve a particular implementation. For example, if the pixel drive strength is implemented as a combination of current driven by a selected subset of the set of available current sources, pixel driver multiplexor 310 may combine these streams of current into a single current that the pixel receives. In this example, pixel driver multiplexor 310 would be a single node (conductor) feeding into the pixel and onto which all of the selected currents are driven.

Figure 4:
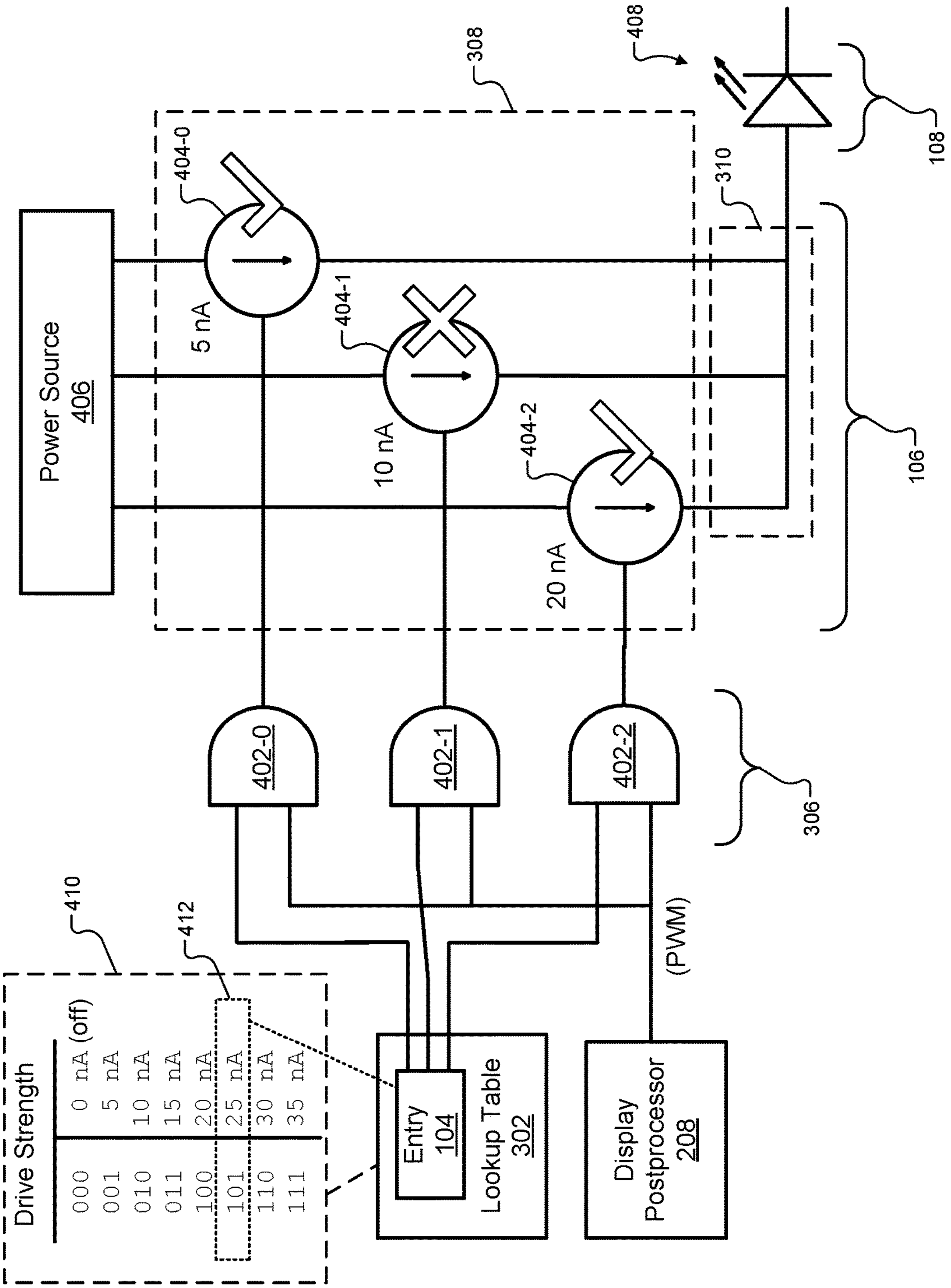
FIG. 4 shows an illustrative way that a drive strength may be selected from plurality of drive strengths available to a pixel driver driving a pixel in accordance with principles described herein.

To illustrate this type of approach, FIG. 4 shows an illustrative way that a drive strength may be selected from plurality of drive strengths available to a pixel driver driving a pixel in accordance with principles described herein. As has been described in relation to FIG. 3, the implementation explicitly illustrated in FIG. 4 involves multiple drive strengths being made available by selecting one or more current sources from a plurality of available current sources so that the current from all the selected current sources is combined to drive the pixel. As such, if the circuitry of FIG. 4 is understood to be reproduced for each pixel driver 106 driving each pixel 108 in a particular display system implementation, FIG. 4 shows how different drive strengths could be selected for different pixels according to their performance attributes.

For example, a first pixel driver could be configured to select a first drive strength by activating a first subset of current sources from a first set of current sources available to the first pixel driver, while a second pixel driver could be configured to select a second drive strength by activating a second subset of current sources from a second set of current sources available to the second pixel driver. While the second set of current sources may be equivalent to the first set of current sources in this example (i.e., both of the pixel drivers may have the same types of current sources available), the second subset of current sources (i.e., the current sources selected to be activated) may be distinct from the first subset of current sources to thereby cause the first and second pixel drivers to ultimately drive their respective pixels with different amounts of current.

Though FIG. 4 shows a configurable drive strength implemented using this type of selectable set of current sources, it will be understood that other ways of customizing the drive strength or selecting a particular drive strength from a plurality of drive strengths available to a pixel driver may also be employed in certain implementations. Certain implementations may use other selection mechanisms, more complex multiplexing techniques, or the like.

FIG. 4 is shown to focus on a single entry 104 within lookup table 302, a single PWM signal from display postprocessor 208, a single mask 306, and a single pixel driver 106. It is not specified which pixel 108 (e.g., pixel 108-1, pixel 108-2, etc.) these circuit components correspond to, since it will be understood that the illustrated circuitry may be present in a similar or identical form for each pixel 108 (more particularly, for each pixel color component of each full color pixel) that is implemented in a particular display system implementation.

As shown, the mask 306 illustrated in FIG. 4 (e.g., representing one of the set of masks, such as mask 306-1 or mask 306-2) includes a plurality of AND gates in this example. Specifically, an AND gate 402-0 is configured to mask a least significant bit (bit 0) of the entry 104 provided by the lookup table 302, an AND gate 402-1 is configured to mask the next least significant bit (bit 1) of the entry 104, and an AND gate 402-2 is configured to mask the most significant bit (bit 2) of the entry 104, where this particular example includes entries with these three bits (to create 2^3=8 possible drive strengths that are available to the pixel driver 106, as will be further described below). These AND gates 402-0 through 402-2 (collectively referred to as AND gates 402) are each shown to perform a logical AND operation on their respective bit from lookup table 302 and on the PWM signal from display postprocessor 208 (i.e., the digital signal modulating the pixel on and off as has been described and as will be illustrated in more detail below).

Accordingly, when the PWM signal (or other signal indicating when the pixel 108 is to be turned on) is low (zero), all of gates 402 output a low signal so as not to enable any current to flow and thereby turning the pixel off. When the PWM signal is high (one), however, each gate therefore outputs its respective bit from entry 104. These outputs then feed into respective current sources and act to activate (enable) or deactivate (disable) these current sources. Specifically, as shown, a current source 404-0 is enabled by the output of gate 402-0, a current source 404-1 is enabled by the output of gate 402-1, and a current source 404-2 is enabled by the output of gate 402-2. Each of these current sources is shown to be powered by a power source 406 that may provide power to this circuitry and other similar circuitry for pixel drivers 106 throughout the system.

As illustrated by a dashed line box around these current sources 404-0 through 404-2 (collectively referred to as current sources 404), a particular pixel drive strength 308 (e.g., one of drive strength 308-1 or drive strength 308-2) may be selected by the combination of which current sources are activated and deactivated at a particular time. Accordingly, in order to provide a variety of different possible drive strengths, the different current sources 404 are shown to be configured to provide different amounts of current when activated. Specifically, current source 404-0 is shown to provide 5 nanoamps (nA) when activated, current source 404-1 is shown to provide 10 nA when activated, and current source 404-2 is shown to provide 20 nA when activated. These particular values are provided only by way of example and are not limiting, as is the variance between them. It is noted, however, that the particular variance shown between current sources (with each successive current source 404 doubling the amount of current as the one previous) may allow for a linear plurality of drive strength options, as will be described in more detail below.

As mentioned above, the multiplexing of a drive strength selected by activating and deactivating different current sources from a plurality of available current sources may be accomplished by combining the currents together at a single node (e.g., on a single conductor input to the pixel). To illustrate, FIG. 4 shows a dashed box labeled as pixel driver multiplexor 310 where current from each of the activated current sources 404 is combined to drive a light emitting diode (LED) 408 (e.g., a red, green, or blue LED or an LED of another suitable color) that, in this example, is shown to implement the pixel 108. More particularly, as shown, current produced by each activated current source of a selected subset of current sources may be combined at this node to drive the pixel.

A chart 410 of possible drive strengths given this particular combination of masks and current sources is shown to be associated with lookup table 302 in FIG. 4. Specifically, in the left column of chart 410, a three-bit pixel performance data value is shown. These values may be stored as the entries 104 in lookup table 302 and may result in the corresponding current values or drive strengths indicated in the right-hand column of chart 410. Specifically, for example, for an entry of "000", each of the current sources 404 would be disabled or deactivated, resulting in a drive strength of 0 nA (off). For an entry of "001", only the current source corresponding to the least significant bit (i.e., current source 404-0) would be activated while the others would be deactivated, thereby resulting in a drive strength of 5 nA.

All the possible bit combinations for an entry 104 are shown in chart 410, from the 0 nA drive strength produced when all of current sources 404 are disabled to a 35 nA drive strength produced when all of current sources 404 are enabled. As one more particular example, an arbitrary entry 412 is highlighted that includes a bit sequence of "101." If it is assumed that the entry 104 in this example, holds the "101" of entry 412, icons on each current source 404 show that, after masking by gates 402, only current source 404-0 and current source 404-2 are activated (indicated by check mark icons) while current source 404-1 is deactivated (indicated by an 'X' icon). Accordingly, as indicated by chart 410, the "101" value causes 5 nA to by produced by current source 404-0, 0 nA to be produced by current source 404-1 (since current source 404-1 is deactivated), and 20 nA to be produced by current source 404-2. When these are combined at the node serving as a pixel driver multiplexor 310, LED 408 is ultimately driven by the 25 nA indicated by chart 410 (whenever the PWM signal provided by display postprocessor 208 is also high).

While the collection of gates 402 has been described as a single mask 306 (corresponding, for example, to mask 306-1 or 306-2 of FIG. 3) of the overall set of masks 306 (corresponding to all the masks for all the pixel drivers), this collection of gates may also be considered as a set of masks in a sense, since each individual AND gate masks the PWM signal from reaching the respective current sources 404 in accordance with the bits of the entry 104. Accordingly, it may be said that a first set of masks (e.g., a collection of individual AND gates) associated with the first set of current sources (e.g., current sources 404) may be configured to activate, based on a first entry stored in the memory (e.g., in lookup table 302), a first subset of current sources without activating a remainder of the first set of current sources; and that a second set of masks (another collection of individual AND gates for a different pixel) associated with a second set of current sources (another set of current sources for a different pixel) may be configured to activate, based on a second entry stored in the memory, the second subset of current sources without activating a remainder of the second set of current sources. In other words, the set of masks 306 shown in FIG. 3 will be understood, in some implementations, to refer to a set of respective sets of masks (for each pixel driver and pixel), where each of these sets of masks may further include many possible subsets that may be selected to provide the drive strengths that may be appropriate for their respective pixels.

As mentioned above, in a situation when a first pixel driver is configured to select a first drive strength by activating a first subset of current sources from a first set of current sources available to the first pixel driver and a second pixel driver is configured to select a second drive strength by activating a second subset of current sources from a second set of current sources available to the second pixel driver, it may be the case that both sets of current sources are equivalent. Equivalent sets of current sources, as used herein, refer to sets of current sources that include the same number of current sources configured to provide the same amounts of current (e.g., identical copies of the sets of current sources 404 shown in FIG. 4). Even while the sets of current sources between two pixels may be equivalent, however, the selected subsets of current sources (i.e., the combination of these current sources that are activated based on the entry) may be distinct between the two pixels, such that different drive strengths are produced by the current sources selected to be activated.

In one such case, for example, the first subset of current sources may include a first current source configured to produce a first amount of current (e.g., the 5 nA of current source 404-0) and may exclude any current source configured to produce a second amount of current (e.g., the 10 nA of current source 404-1). At the same time, the second subset of current sources may include a second current source configured to produce the second amount of current (e.g., the 10 nA in this example) and may exclude any current source configured to produce the first amount of current (e.g., the 5 nA in this example). Put another way, different, non-overlapping current sources may be selected in certain situations (i.e., one pixel having one current source selected while another pixel has a different current source selected, even though both options are available to both pixels).

In other situations, there may be overlap between two pixels with the same options to choose from in their respective sets of current sources. For example, the first subset of current sources may again include a first current source configured to produce a first amount of current (e.g., the 5 nA of current source 404-0) and may exclude any current source configured to produce a second amount of current (e.g., the 10 nA of current source 404-1). However, in this case, the second subset of current sources may not only include a second current source configured to produce the second amount of current (e.g., the 10 nA in this example) but also may further include a third current source configured to produce the first amount of current (e.g., its own current source that also provides the 5 nA in this example). In other words, while these two pixels are not driven identically (since only one utilizes a 10 nA current source), their selections do overlap (since both utilize respective 5 nA current sources).

While FIG. 4 shows a circuit that includes three different current sources 404 with corresponding masks to enable up to eight different analog drive strengths for LED 408, it will be understood that any suitable number of current sources and corresponding circuitry may be implemented as may serve a particular implementation. For instance, certain implementations may use two different current sources (and corresponding mask gates) per pixel, while other implementations may use a relatively large number (e.g., 5, 10, 20, or more current sources and masks per pixel).

As described above, optimizing pixel performance in a display system may involve what has been referred to herein as the hybrid approach of analog (e.g., voltage or current modulation) and digital (e.g., pulse-width of other time-based modulation) means of pixel brightness control. Specifically, as had been described, custom analog drive strengths may be applied to different pixels in connection with their performance characteristics while time-modulated signals may be relied on to dynamically drive pixels to the appropriate brightness levels called for from image to image or frame to frame. More particularly, a first pixel driver driving a first pixel at a first drive strength and a second pixel driver driving a second pixel at a second drive strength will be considered. The first pixel driver may be configured to drive the first pixel in accordance with a first binary pulse-width modulation (PWM) signal associated with the first pixel, such that a first apparent brightness of the first pixel during a time period is determined by both the first drive strength and the first binary pulse-width modulation signal. The second pixel driver may then be configured to drive the second pixel in accordance with a second binary pulse-width modulation (PWM) signal associated with the second pixel, such that a second apparent brightness of the second pixel during the time period is determined by both the second drive strength and the second binary pulse-width modulation signal.

Figure 5A:
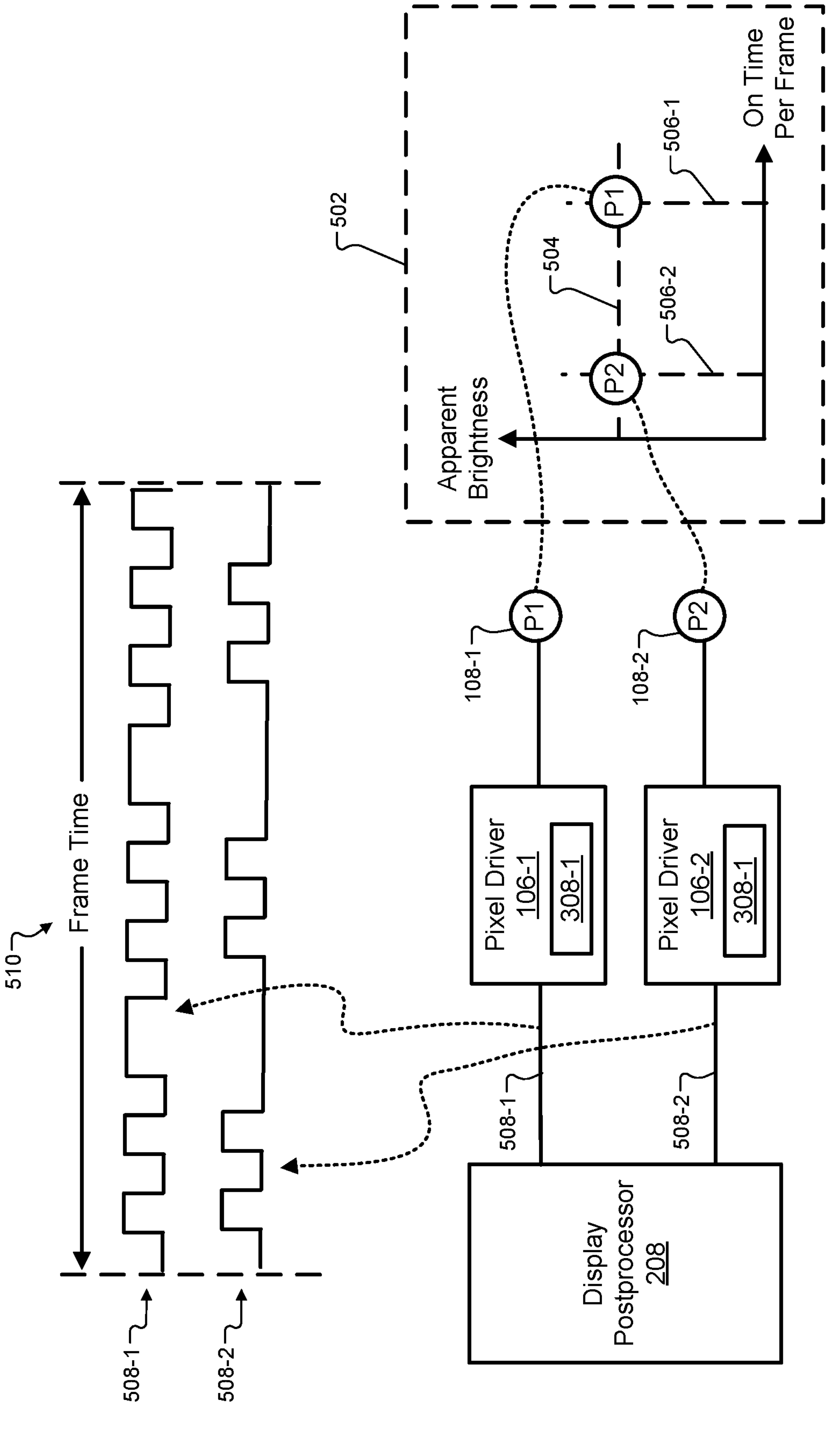
FIG. 5A shows a first example configuration in which illustrative pixel drivers use a hybrid approach to drive pixels with different performance levels to a same apparent brightness level in accordance with principles described herein.
Figure 5B:
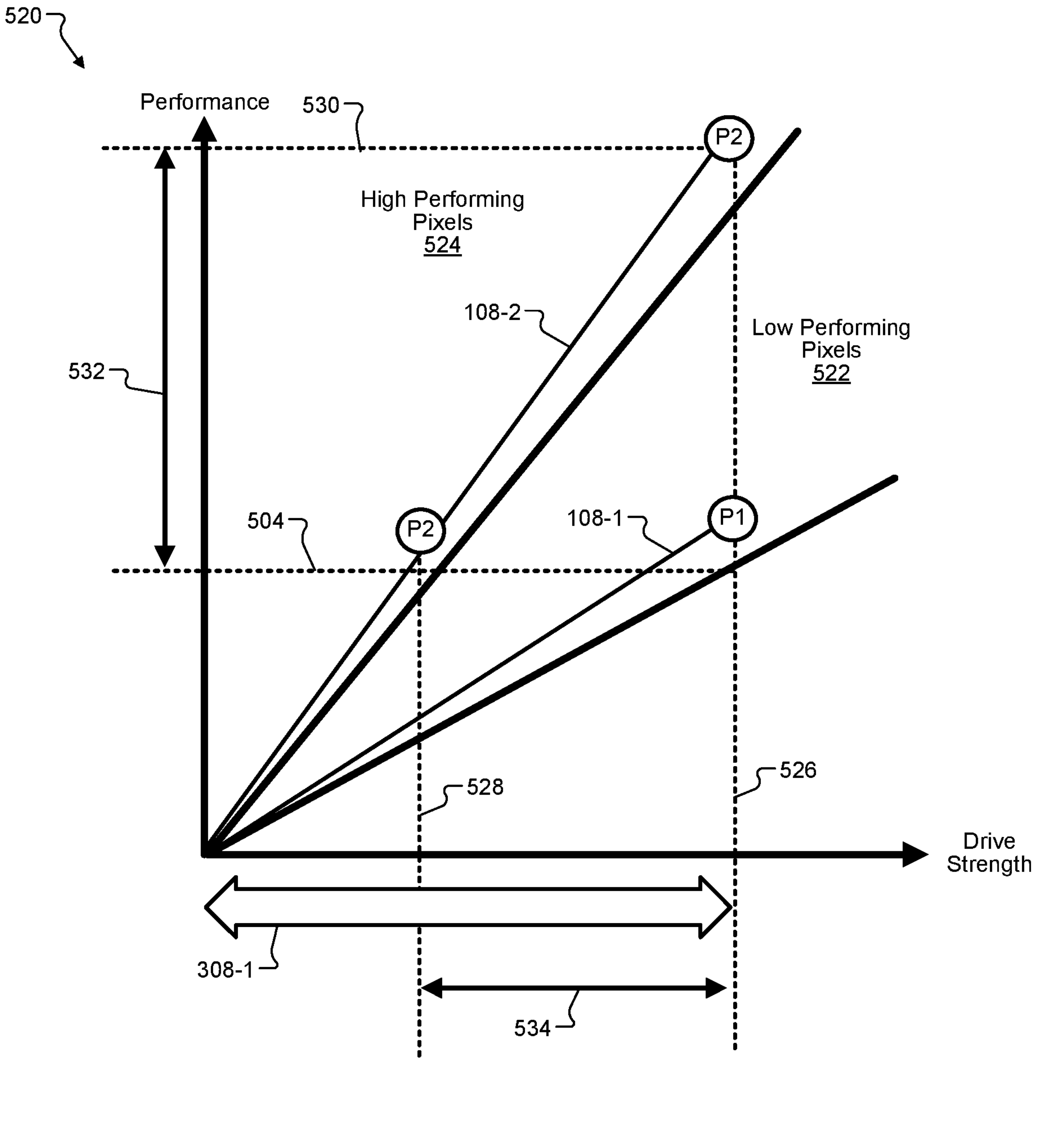
FIG. 5B shows illustrative performance aspects that may arise from the example configuration of FIG. 5A in accordance with principles described herein.
Figure 6A:
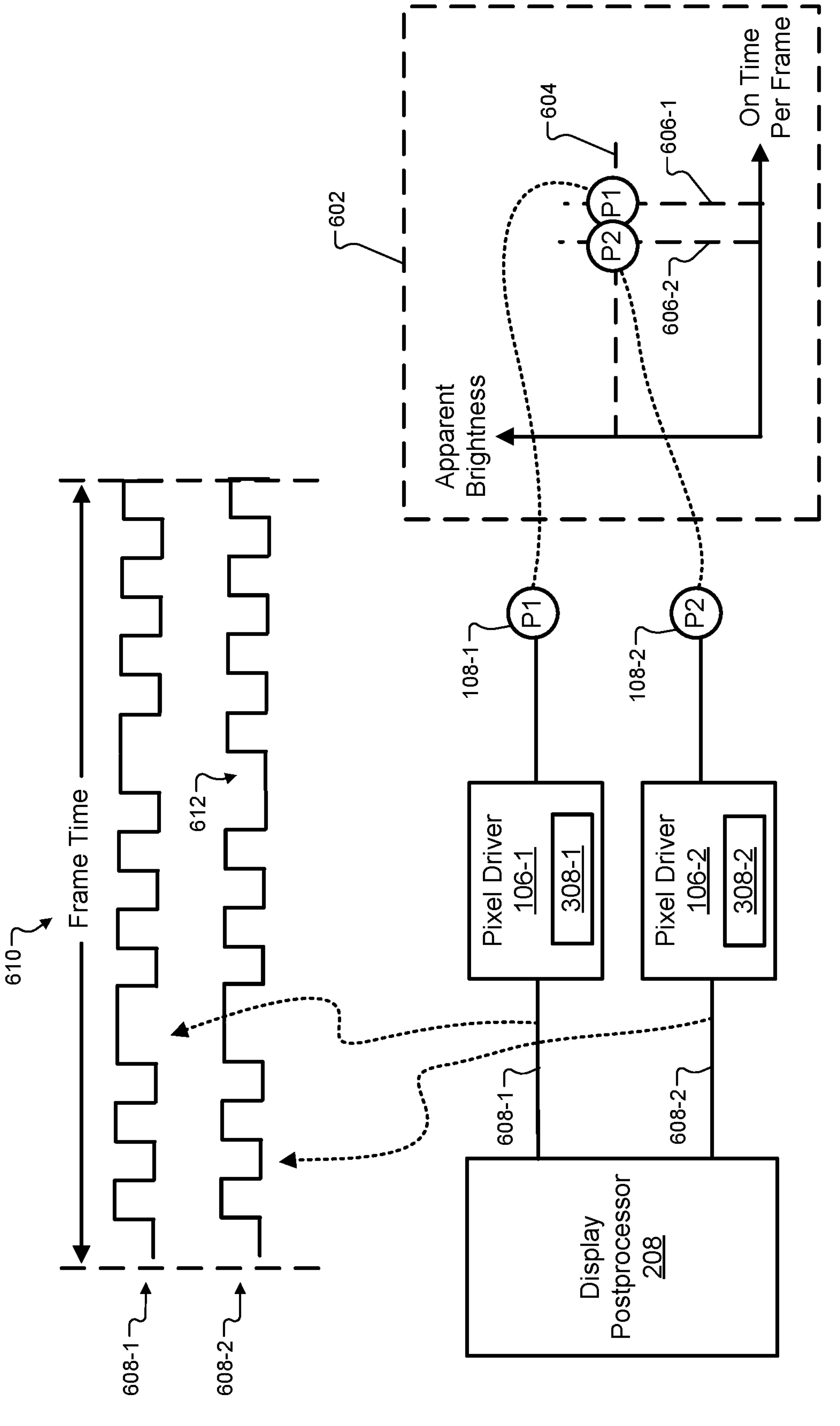
FIG. 6A shows a second example configuration in which illustrative pixel drivers use a hybrid approach to drive pixels with different performance levels to a same apparent brightness level in accordance with principles described herein.
Figure 6B:
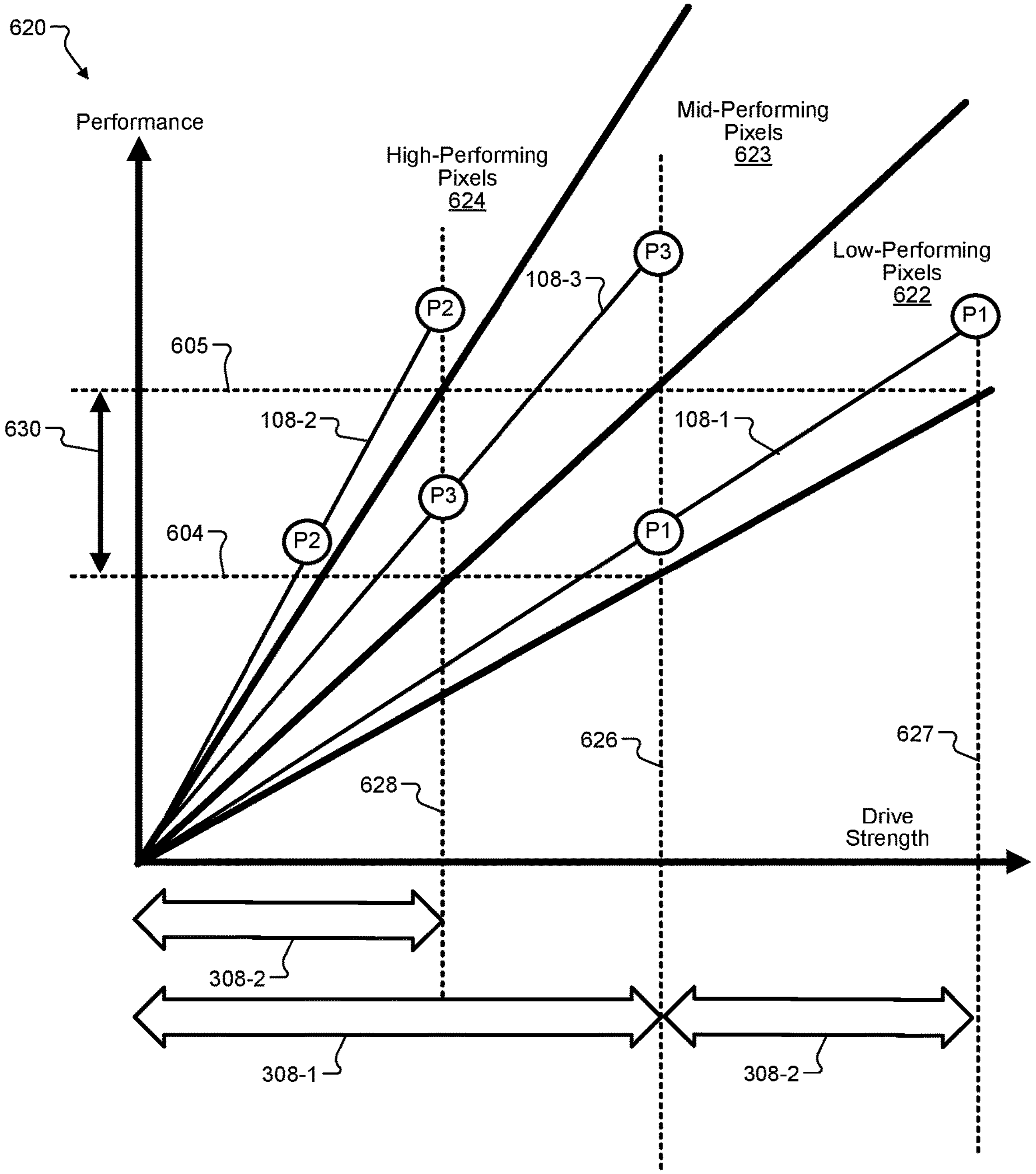
FIG. 6B shows illustrative performance aspects that may arise from the example configuration of FIG. 6A in accordance with principles described herein.

FIGS. 5A-6B will now be described to more fully illustrate the interplay between these two factors of apparent brightness in the hybrid approach. Specifically, as will be described, FIG. 5A shows a first example configuration in which illustrative pixel drivers use a hybrid approach to drive pixels with different performance levels to a same apparent brightness level, while FIG. 5B shows illustrative performance aspects that may arise from the example configuration of FIG. 5A. In the example of FIGS. 5A and 5B, the illustrative pixels are shown to have selected the same drive strength to simulate a situation that is commonly encountered with conventional display systems. In contrast, FIG. 6A then shows a second example configuration in which illustrative pixel drivers use a hybrid approach to drive pixels with different performance levels to a same apparent brightness level, and FIG. 6B shows illustrative performance aspects that may arise from the example configuration of FIG. 6A. In these figures, however, the illustrative pixels are shown to have selected different drive strengths based on their different performance characteristics to thereby showcase the particular technical benefits that are provided by systems and methods described herein for optimizing pixel performance.

In FIG. 5A, two pixel drivers 106-1 and 106-2 are shown to be configured with a same drive strength 308-1. For example, referring back to chart 410 in the example of FIG. 4, drive strength 308-1 could be applied by an entry 104 that only activates current source 404-1 (while leaving current sources 404-0 and 404-2 deactivated) by storing “010”. These pixel drivers 106-1 and 106-2 are shown to drive, respectively, pixels 108-1 and 108-2. As described above, it will be assumed for purposes of illustration that pixel 108-1 has a lower performance level than pixel 108-2 (e.g., due to the manufacturing, the optics, the relative positions of the pixels on the panel, a combination of these, etc.).

As shown, a graph 502 includes a y-axis that indicates an “Apparent Brightness” of pixels plotted to the graph, and an x-axis that indicates the “On Time Per Frame” that a PWM signal must have to achieve that apparent brightness. While an actual transient brightness of a pixel may be dependent on both its performance level and the analog values with which the pixel is driven, an apparent brightness, as that term is used herein, refers to a longer term (e.g., over the course of an entire frame length, etc.) average brightness of the pixel that would be perceived by a human viewer looking at the pixel. Specifically, as has been described, binary pulse-width modulation of a pixel allows the average brightness of a pixel to be controlled by rapidly activating and deactivating the pixel such that the pixel is on (at whatever transient brightness the pixel may have) for a proportion of the frame time that creates an illusion of the pixel being on the entire frame time but only at the desired brightness (i.e., the apparent brightness). Thus, for example, a pixel with the maximum apparent brightness would actually be sustained in an ON state for an entirety of a frame, while a pixel with the minimum apparent brightness (other than being completely off) would flicker into the ON state for only one small portion of the frame time while remaining in an OFF state the rest of the time.

With these principles in mind, graph 502 illustrates that, due to its lower performance (and the fact that both pixel drivers 106-1 and 106-2 are applying the same drive strength 308-1 in this example), pixel 108-1 (the circle labeled “P1”) achieves the apparent brightness 504 that is desired by having a relatively large ON time per frame 506-1. To further illustrate, an example PWM signal 508-1 provided by display postprocessor 208 to pixel driver 106-1 is shown in FIG. 5A to oscillate frequently over the course of one frame time 510 period, appearing to be high (e.g., in the ON state in this example) roughly 60%-70% of the time. In contrast, graph 502 further illustrates that, due to its higher performance (and, again, the fact that both pixel drivers are applying the same drive strength 308-1 in this example), pixel 108-2 (the circle labeled “P2”) is configured to achieve the apparent brightness 504 with a significantly smaller ON time per frame 506-2. To illustrate, another example PWM signal 508-2 provided by display postprocessor 208 to pixel driver 106-2 is shown in FIG. 5A to oscillate less frequently during the frame time 510 period, appearing to be high (e.g., in the ON state) only roughly 30%-40% of the time.

While it will be understood that these particular PWM signals and percentages are selected arbitrarily for illustrative purposes, FIG. 5A shows that, due to their relative performance levels, pixel 108-1 may consume more power (e.g., by switching more often, by remaining in the high state for longer, etc.) than pixel 108-2 and may have more limited dynamic range on the high end of brightness as a result (i.e., there are fewer brightness levels even brighter than apparent brightness 504 available to pixel 108-1 than to pixel 108-2). By the same token, FIG. 5A also shows that, while pixel 108-2 may consume less power than pixel 108-1 for apparent brightness 504, pixel 108-2 may have more limited dynamic range on the low end of brightness (i.e., there are fewer brightness levels dimmer than apparent brightness 504 available to pixel 108-2 than to pixel 108-1). It would be desirable for pixels 108-1 and 108-2 to be more uniform on graph 502 (e.g., for ON time per frame 506-1 and ON time per frame 506-2 to be closer to one another) to optimize the average power usage and dynamic range across these pixels (and, by extension, across all the pixels of an entire panel).

FIG. 5B illustrates certain consequences of this example configuration in another way. Specifically, in FIG. 5B, pixels 108-1 and 108-2 are plotted on a graph 520 similar to the graph described in relation to FIG. 1. As shown, drive strength is represented on the x-axis while pixel performance (e.g., brightness or the like) is represented on the y-axis, with each pixel being represented by a line extending from the origin to indicate the interplay of these factors for the pixel (e.g., to indicate their performance level, brightness efficiency level, or the like). In this case, pixel 108-1 is shown in a region 522 of low performing pixels that have a lower slope (i.e., requiring more drive strength for a given amount of performance). Pixel 108-2, on the other hand, is shown in a region 524 of high performing pixels with greater slopes (i.e., requiring less drive strength for a given amount of performance). If the desired performance of both pixels is represented by a dotted horizontal line labeled as brightness 504, pixel 108-1 is shown to need a relatively strong drive strength 526 to achieve this performance, while pixel 108-2 is shown to be configured to achieve (e.g., capable of achieving) the same thing using a considerably smaller drive strength 528. However, because both pixel drivers 106-1 and 106-2 in this configuration rely on identical drive strength

308-1 (as shown as described above in relation to FIG. 5A), pixel 108-2 is shown to intersect with drive strength 526 at a far higher performance 530. In other words, driven at this drive strength 526, pixel 108-1 may be very near the desired brightness 504 while pixel 108-2 may be too bright and needing to compensate by using much less on time per frame (thereby compromising its dynamic range, as has been described).

Certain arrows around graph 520 indicate certain aspects that graph 520 illustrates. First, a block arrow labeled to represent drive strength 308-1 shows the relationship between the drive strength described above in relation to FIG. 5A and drive strengths illustrated in FIG. 5B. Specifically, the drive strength 526 may be used for both pixels rather than something that would be more optimal for pixel 108-2. An arrow 532 on the y-axis then represents unrealized performance for pixel 108-2. In other words, by driving pixel 108-2 at drive strength 526, a certain amount of power and dynamic range are lost that do not necessarily need to be if pixel 108-2 were driven at a more optimal level. An arrow 534 on the x-axis then represents the excess overhead that is expended on pixel 108-2 (e.g., excess power usage required to drive pixel 108-2 at drive strength 526 rather than drive strength 528, etc.).

As made apparent by FIGS. 5A and 5B, various technical problems related to performance, power consumption, dynamic range, and so forth could be at least partially solved or addressed by customizing the drive strength 308 applied to each pixel rather than by relying on the same one. Accordingly, FIG. 6A shows a second example configuration in which illustrative pixel drivers again use the hybrid approach to drive pixels with different performance levels to a same apparent brightness level, but, in this case, do so using different (more customized) pixel drive strengths 308.

Specifically, as shown in FIG. 6A (which uses a similar numbering scheme as FIG. 5A), the pixel drivers 106-1 and 106-2 driving respective pixels 108-1 and 108-2 now apply different drive strengths 308. Specifically, as in the configuration of FIG. 5A, pixel driver 106-1 is shown to apply drive strength 308-1 to pixel 108-1. However, in contrast to the configuration of FIG. 5A, pixel driver 106-2 is shown to apply drive strength 308-2 to pixel 108-2. Given that pixel 108-2 has been determined to be a higher performer than pixel 108-1, drive strength 308-2 may be a smaller drive strength than drive strength 308-1. For example, if drive strength 308-1 was associated with the "010" entry shown in FIG. 4, drive strength 308-2 could be generated by the "001" entry shown in FIG. 4 so that only the 5 nA current source 404-0 is activated, while the other current sources 404-1 and 404-2 remain deactivated.

As a consequence of these different drive strengths 308, a graph 602 in FIG. 6A is similar to graph 502 in FIG. 5A, but shows that, for this configuration, pixels 108-1 and 108-2 are configured to achieve a desired brightness 604 using respective on times per frame 606-1 and 606-2 that are much closer together. For example, if on time per frame 606-1 is the same as on time per frame 506-1, the lower drive strength 308-2 with which pixel 108-2 is now driven allows pixel 108-2 to now achieve this desired brightness 604 with considerably more on time per frame, thereby creating more dynamic range for dimmer levels and otherwise making the pixels more uniform. This is further illustrated by the much smaller disparity between a PWM signal 608-1 provided to pixel driver 106-1 and a PWM signal 608-2 provided to pixel driver 106-2 to achieve the same brightness 604. As illustrated for one frame time 610 period, PWM signals 608-1 and 608-2 are nearly identical except for one small portion 612 of the period in which PWM signal 608-2 is low while PWM signal 608-1 is high.

Similar to FIG. 5B, FIG. 6B illustrates certain consequences of the example configuration of FIG. 6A. In FIG. 6B, pixels 108-1 and 108-2 are again plotted on a graph 620 similar to graph 520 and the graph described in relation to FIG. 1, in that drive strength is represented on the x-axis, pixel performance is represented on the y-axis, and various pixels are represented by respective lines extending from the origin of the graph. Here again, pixel 108-1 is shown in a region 622 of low-performing pixels with relatively low slopes and pixel 108-2 is shown in a region 624 of high-performing pixels with greater slopes. Additionally, in this case, the addition of other drive strength possibilities has created a new region 623 of mid-performing pixels that are somewhere between the low-performing and high-performing pixels that have been described. An example pixel 108-3 (labeled with a circle P3) is shown in this region and will be described below.

If the desired performance of all of the pixels is represented by a dotted horizontal line labeled as brightness 604, pixel 108-1 is shown to need a relatively strong drive strength 626 to achieve this performance, while pixels 108-2 and 108-3 are each shown to be configured to achieve the same thing using a considerably smaller drive strength 628. In this case, pixel 108-2 is such a high performer that pixel 108-2 is shown to be configured to meet desired apparent brightness 604 using an even lower drive strength than drive strength 628, though, in this example, such a drive strength may not be available or desirable for reasons that will be made apparent.

To achieve brightness 604 with all of these pixels, pixel 108-1 may use drive strength 308-1 (as shown below the graph stretching from zero to the dotted line of drive strength 626), pixel 108-2 may use drive strength 308-2 (as further shown below the graph stretching from zero to the dotted line of drive strength 628), and pixel 108-3 may also use drive strength 308-2. However, as a benefit of the optimization that these different drive strength options has provided, FIG. 6B also illustrates another possibility. Rather than each of the pixels achieving the performance associated with brightness 604, a higher performance of a brightness 605 may be achieved for pixels in all of the regions by using combinations of the drive strengths 308. Specifically, as shown, low-performing pixel 108-1 may achieve this higher performance by being driven at a drive strength 627 that can be implemented as a combination of drive strengths 308-1 and 308-2 (e.g., by applying the "011" entry in the example of FIG. 4). Mid-performing pixel 108-3 may then achieve brightness 605 by using drive strength 626 (implemented by drive strength 308-1 by applying the "010" entry), and high-performing pixel 108-2 may achieve brightness 605 by using drive strength 628 (implemented by drive strength 308-2 by applying the "001" entry). A vertical arrow 630 illustrates the performance improvement that may be gained by employing these different drive strength options to pixels having these different performance levels.

Figure 7A:
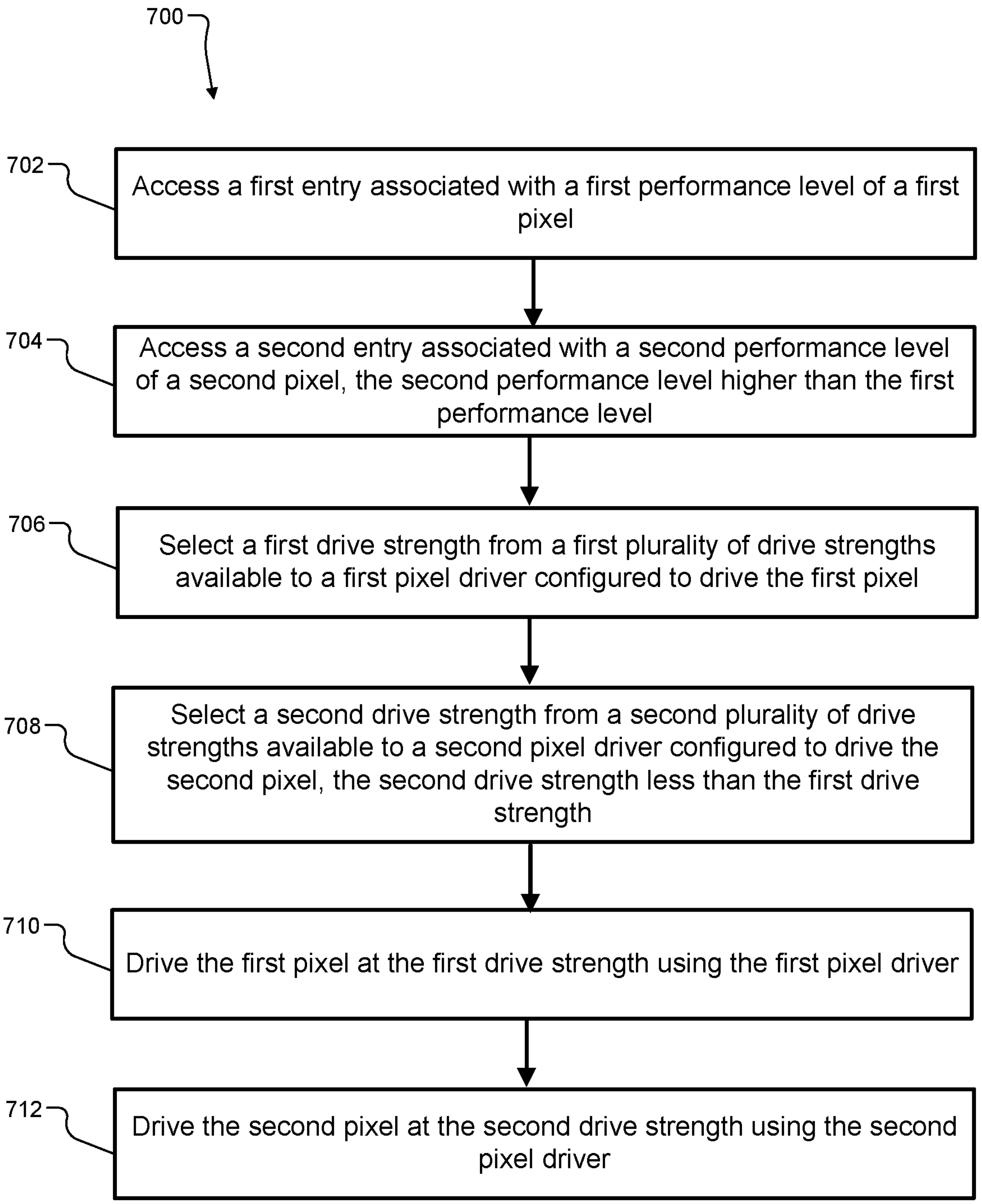
FIG. 7A shows an illustrative method that may be performed by a display system in accordance with principles described herein.

FIG. 7A shows an illustrative method 700 that may be performed by a display system in accordance with principles described herein. While FIG. 7A shows illustrative operations 702-712 according to one implementation, other implementations may omit, add to, reorder, and/or modify any of the operations 702-712 shown in FIG. 7A. In some examples, multiple operations shown in FIG. 7A or described in relation to FIG. 7A may be performed concurrently (e.g., in parallel) with one another, rather than being performed sequentially as illustrated and/or described. Each of operations 702-712 of method 700 will now be described in more detail as the operations may be performed by an implementation of display system 100 (e.g., display system 200, display system 300, etc.).

At operation 702, display system 100 may access a first entry from a memory that stores a set of pixel performance data entries. The first entry may be associated with a first performance level of a first pixel. For example, based on a previous calibration procedure in which the first performance level was characterized or otherwise identified, the first entry may be selected to cause a drive strength used for the first pixel to be optimal for the performance capabilities of the pixel. If the first pixel is a relatively low performer (e.g., relatively inefficient in terms of the brightness produced per unit of power provided to the pixel), for instance, the first entry may hold a value that leads a larger drive strength to be used in powering the first pixel (e.g., a value relatively low down on chart 410 in FIG. 4 in that type of implementation).

At operation 704, display system 100 may similarly access a second entry from the memory. The second entry may also be included in the set of pixel performance data entries stored by the memory and may be associated with a second performance level of a second pixel. For example, the second performance level may be higher than the first performance level, such that the second entry may hold a value that leads a smaller drive strength to be used in powering the second pixel (e.g., a value relatively high up on chart 410 in FIG. 4 for that type of implementation.

At operation 706, display system 100 may select a first drive strength from a first plurality of drive strengths available to a first pixel driver configured to drive the first pixel. For example, the selection at operation 706 may be performed based on the first entry stored in the memory and accessed at operation 702. In the example above in which the first entry is associated with a relatively low performance level, for instance, the first drive strength may be relatively high, as mentioned above (e.g., a value relatively low down on chart 410 in FIG. 4 in that type of implementation).

At operation 708, display system 100 may select a second drive strength from a second plurality of drive strengths available to a second pixel driver configured to drive the second pixel. Similar to the selection at operation 706, the selection at operation 708 may be performed based on the second entry stored in the memory and accessed at operation 704. For instance, in the example above in which the second entry is associated with a relatively high performance level, the second drive strength may be relatively low (e.g., lower than the first drive strength). As mentioned above, for example, this may be implemented by a value relatively high on chart 410 in FIG. 4 in that type of implementation.

At operation 710, display system 100 may drive the first pixel using the first pixel driver. For example, having selected the first drive strength based on the first entry at operation 706, display system 100 may use the first pixel driver to drive the first pixel at the first drive strength.

At operation 712, display system 100 may drive the second pixel using the second pixel driver. For example, having selected the second drive strength based on the second entry at operation 708, display system 100 may use the second pixel driver to drive the second pixel at the second drive strength.

Figure 7B:
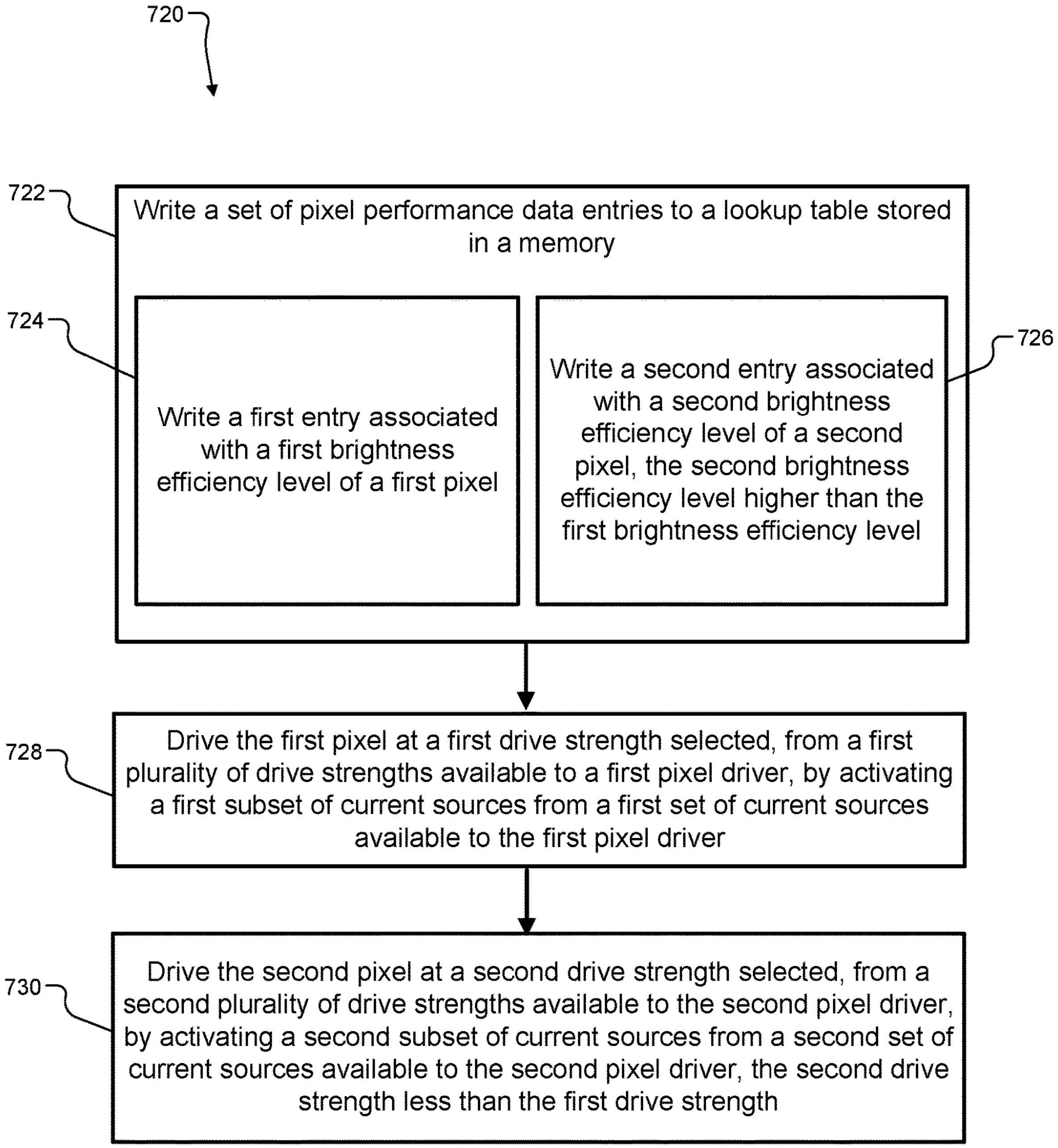
FIG. 7B shows another illustrative method that may be performed by a display system in accordance with principles described herein.

FIG. 7B shows another illustrative method 720 that may be performed by a display system in accordance with principles described herein. As with FIG. 7A, while FIG. 7B shows illustrative operations 722-730 according to one implementation, other implementations may omit, add to, reorder, and/or modify any of the operations 722-730 shown in FIG. 7B. In some examples, multiple operations shown in FIG. 7B or described in relation to FIG. 7B may be performed concurrently (e.g., in parallel) with one another, rather than being performed sequentially as illustrated and/or described. Each of operations 722-730 of method 720 will now be described in more detail as the operations may be performed by an implementation of display system 100 (e.g., display system 200, display system 300, etc.).

At operation 722, display system 100 may write a set of pixel performance data entries to a lookup table stored in a memory. As shown, this writing of the pixel performance data entries may include writing at least two particular entries that are included in the set of pixel performance data entries and are to be represented in the lookup table. These entries are written at operations 724 and 726, which, as shown, may be performed in the course of performing operation 722.

At operation 724, display system 100 may write a first entry associated with a first brightness efficiency level of a first pixel. For example, the first brightness efficiency level may be determined based on factors including 1) a first pixel efficiency characterization of the first pixel (e.g., such as any pixel efficiency characterization described herein), and/or 2) a first characteristic of a first optical device associated with the first pixel (e.g., such as any optical device characteristic described herein).

At operation 726, display system 100 may write a second entry associated with a second brightness efficiency level of a second pixel. For example, the second brightness efficiency level may be determined based on factors including 1) a second pixel efficiency characterization of the second pixel (e.g., such as any pixel efficiency characterization described herein), and/or 2) a second characteristic of a second optical device associated with the second pixel (e.g., such as any optical device characteristic described herein). In this example method, it will be assumed that the second brightness efficiency level is higher than the first brightness efficiency level determined and written at operation 724.

At operation 728, display system 100 may drive the first pixel using a first pixel driver. For example, based on the first entry of the lookup table, the display system may drive the first pixel at a first drive strength selected from a first plurality of drive strengths available to the first pixel driver. This selection of the first drive strength may be performed, for instance, by activating a first subset of current sources from a first set of current sources available to the first pixel driver.

At operation 730, display system 100 may drive the second pixel using a second pixel driver. For example, based on the second entry of the lookup table, the display system may drive the second pixel at a second drive strength selected from a second plurality of drive strengths available to the second pixel driver. This selection of the second drive strength may be performed, for instance, by activating a second subset of current sources from a second set of current sources available to the second pixel driver. Even if the second set of current sources is equivalent to the first set (i.e., offering the same options as the first set, in particular the same output currents as with the first set may be generated by combining some or all of the current sources of the second set), the second subset of current sources activated at operation 730 may be distinct from the first subset of current sources activated at operation 728. For example, given the assumption mentioned above that the second brightness efficiency level is higher than the first brightness efficiency level, the second subset of current sources selected and activated may result in the second drive strength being lower than the first drive strength.

The following examples describe systems and methods for optimizing pixel performance in a display system:

1. A display system comprising: a memory configured to store a set of pixel performance data entries including: a first entry associated with a first performance level of a first pixel, and a second entry associated with a second performance level of a second pixel, the second performance level higher than the first performance level; a first pixel driver configured to drive the first pixel at a first drive strength selected, based on the first entry stored in the memory, from a first plurality of drive strengths available to the first pixel driver; and a second pixel driver configured to drive the second pixel at a second drive strength selected, based on the second entry stored in the memory, from a second plurality of drive strengths available to the second pixel driver, the second drive strength lower than the first drive strength.
2. The display system of any of the preceding examples, wherein the first pixel driver is configured to drive the first pixel in accordance with a binary pulse-width modulation signal associated with the first pixel, such that an apparent brightness of the first pixel during a time period is determined by both the first drive strength and the binary pulse-width modulation signal.
3. The display system of any one of any of the preceding examples, wherein: the first pixel driver is configured to select the first drive strength by activating a first subset of current sources from a first set of current sources available to the first pixel driver; and the second pixel driver is configured to select the second drive strength by activating a second subset of current sources from a second set of current sources available to the second pixel driver, the second set of current sources being equivalent to the first set of current sources and the second subset of current sources being distinct from the first subset of current sources.
4. The display system of any of the preceding examples, wherein: the first subset of current sources includes a first current source configured to produce a first amount of current and excludes any current source configured to produce a second amount of current; and the second subset of current sources includes a second current source configured to produce the second amount of current and excludes any current source configured to produce the first amount of current.
5. The display system of any of the preceding examples, wherein: the first subset of current sources includes a first current source configured to produce a first amount of current and excludes any current source configured to produce a second amount of current; and the second subset of current sources includes a second current source configured to produce the second amount of current and further includes a third current source configured to produce the first amount of current.
6. The display system of any one of any of the preceding examples, wherein current produced by each activated current source of the first subset of current sources is combined to drive the first pixel.
7. The display system of any one of any of the preceding examples, further comprising: a set of masks associated with the first set of current sources and configured to activate, based on the first entry stored in the memory, the first subset of current sources without activating a remainder of the first set of current sources.
8. The display system of any one of any of the preceding examples, wherein the memory includes a read-only lookup table into which the first entry and the second entry are permanently encoded at a time of manufacture of the display system.
9. The display system of any one of any of the preceding examples, wherein the memory includes a reconfigurable lookup table into which the first entry and the second entry are entered based on calibration performed subsequent to a manufacture of the display system.
10. The display system of any of the preceding examples, wherein the first performance level is a brightness efficiency level determined based on a pixel efficiency characterization of the first pixel performed as part of the calibration.
11. The display system of any of the preceding examples, wherein the first performance level is a brightness efficiency level determined based on a characteristic of an optical device associated with the first pixel, the characteristic identified as part of the calibration.
12. A method comprising: accessing, from a memory storing a set of pixel performance data entries, a first entry of the set of pixel performance data entries, the first entry associated with a first performance level of a first pixel; accessing, from the memory, a second entry of the set of pixel performance data entries, the second entry associated with a second performance level of a second pixel, the second performance level higher than the first performance level; selecting, based on the first entry stored in the memory, a first drive strength from a first plurality of drive strengths available to a first pixel driver configured to drive the first pixel; selecting, based on the second entry stored in the memory, a second drive strength from a second plurality of drive strengths available to a second pixel driver configured to drive the second pixel, the second drive strength lower than the first drive strength; driving the first pixel at the first drive strength using the first pixel driver; and driving the second pixel at the second drive strength lower than the first drive strength using the second pixel driver.
13. The method of any of the preceding examples, wherein the first pixel driver drives the first pixel in accordance with a binary pulse-width modulation signal associated with the first pixel, such that an apparent brightness of the first pixel during a time period is determined by both the first drive strength and the binary pulse-width modulation signal.
14. The method of any one of any of the preceding examples, wherein: the first pixel driver selects the first drive strength by activating a first subset of current sources from a first set of current sources available to the first pixel driver; and the second pixel driver selects the second drive strength by activating a second subset of current sources from a second set of current sources available to the second pixel driver, the second set of current sources being equivalent to the first set of current sources and the second subset of current sources being distinct from the first subset of current sources.
15. The method of any of the preceding examples, wherein current produced by each activated current source of the first subset of current sources is combined to drive the first pixel.
16. The method of any one of any of the preceding examples, wherein the first pixel is driven by activating, by a set of masks associated with the first set of current sources and based on the first entry, the first subset of current sources without activating a remainder of the first set of current sources.

17. The method of any one of any of the preceding examples, wherein the memory includes a reconfigurable lookup table into which the first entry and the second entry are entered based on calibration performed subsequent to a manufacture of a display system performing the method.
18. A method comprising: writing a set of pixel performance data entries to a lookup table stored in a memory, the set of pixel performance data entries including: a first entry associated with a first brightness efficiency level of a first pixel, the first brightness efficiency level determined based on a first pixel efficiency characterization of the first pixel and a first characteristic of a first optical device associated with the first pixel, and a second entry associated with a second brightness efficiency level of a second pixel, the second brightness efficiency level higher than the first brightness efficiency level and determined based on a second pixel efficiency characterization of the second pixel and a second characteristic of a second optical device associated with the second pixel; driving, based on the first entry of the lookup table and using a first pixel driver, the first pixel at a first drive strength selected, from a first plurality of drive strengths available to the first pixel driver, by activating a first subset of current sources from a first set of current sources available to the first pixel driver; and driving, based on the second entry of the lookup table and using a second pixel driver, the second pixel at a second drive strength selected, from a second plurality of drive strengths available to the second pixel driver, by activating a second subset of current sources from a second set of current sources available to the second pixel driver, the second drive strength lower than the first drive strength.
19. The method of any of the preceding examples, wherein: the first pixel driver drives the first pixel in accordance with a binary pulse-width modulation signal associated with the first pixel, such that an apparent brightness of the first pixel during a time period is determined by both the first drive strength and the binary pulse-width modulation signal.
20. The method of any one of any of the preceding examples, wherein current produced by each activated current source of the first subset of current sources is combined to drive the first pixel.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A display system comprising:

a memory configured to store a set of pixel performance data entries including:

a first entry associated with a first performance level of a first pixel, and a second entry associated with a second performance level of a second pixel, the second performance level higher than the first performance level;

a first pixel driver configured to drive the first pixel at a first drive strength selected, based on the first entry stored in the memory, from a first plurality of drive strengths available to the first pixel driver; and a second pixel driver configured to drive the second pixel at a second drive strength selected, based on the second entry stored in the memory, from a second plurality of drive strengths available to the second pixel driver, the second drive strength lower than the first drive strength.

2. The display system of claim 1, wherein the first pixel driver is configured to drive the first pixel in accordance with a binary pulse-width modulation signal associated with the first pixel, such that an apparent brightness of the first pixel during a time period is determined by both the first drive strength and the binary pulse-width modulation signal.

3. The display system of claim 1, wherein:

the first pixel driver is configured to select the first drive strength by activating a first subset of current sources from a first set of current sources available to the first pixel driver; and the second pixel driver is configured to select the second drive strength by activating a second subset of current sources from a second set of current sources available to the second pixel driver, the second set of current sources being equivalent to the first set of current sources and the second subset of current sources being distinct from the first subset of current sources.

4. The display system of claim 3, wherein:

the first subset of current sources includes a first current source configured to produce a first amount of current and excludes any current source configured to produce a second amount of current; and the second subset of current sources includes a second current source configured to produce the second amount of current and excludes any current source configured to produce the first amount of current.

5. The display system of claim 3, wherein:

the first subset of current sources includes a first current source configured to produce a first amount of current and excludes any current source configured to produce a second amount of current; and the second subset of current sources includes a second current source configured to produce the second amount of current and further includes a third current source configured to produce the first amount of current.

6. The display system of claim 3, wherein current produced by each activated current source of the first subset of current sources is combined to drive the first pixel.

7. The display system of claim 3, further comprising a set of masks associated with the first set of current sources and configured to activate, based on the first entry stored in the memory, the first subset of current sources without activating a remainder of the first set of current sources.

8. The display system of claim 1, wherein the memory includes a read-only lookup table into which the first entry and the second entry are permanently encoded at a time of manufacture of the display system.

9. The display system of claim 1, wherein the memory includes a reconfigurable lookup table into which the first entry and the second entry are entered based on calibration performed subsequent to a manufacture of the display system.

10. The display system of claim 9, wherein the first performance level is a brightness efficiency level determined based on a pixel efficiency characterization of the first pixel performed as part of the calibration.

11. The display system of claim 9, wherein the first performance level is a brightness efficiency level determined based on a characteristic of an optical device associated with the first pixel, the characteristic identified as part of the calibration.

12. A method comprising:

accessing, from a memory storing a set of pixel performance data entries, a first entry of the set of pixel performance data entries, the first entry associated with a first performance level of a first pixel;

accessing, from the memory, a second entry of the set of pixel performance data entries, the second entry associated with a second performance level of a second pixel, the second performance level higher than the first performance level;

selecting, based on the first entry stored in the memory, a first drive strength from a first plurality of drive strengths available to a first pixel driver configured to drive the first pixel;

selecting, based on the second entry stored in the memory, a second drive strength from a second plurality of drive strengths available to a second pixel driver configured to drive the second pixel, the second drive strength lower than the first drive strength;

driving the first pixel at the first drive strength using the first pixel driver; and driving the second pixel at the second drive strength lower than the first drive strength using the second pixel driver.

13. The method of claim 12, wherein the first pixel driver drives the first pixel in accordance with a binary pulse-width modulation signal associated with the first pixel, such that an apparent brightness of the first pixel during a time period is determined by both the first drive strength and the binary pulse-width modulation signal.

14. The method of claim 12, wherein:

the first pixel driver selects the first drive strength by activating a first subset of current sources from a first set of current sources available to the first pixel driver; and the second pixel driver selects the second drive strength by activating a second subset of current sources from a second set of current sources available to the second pixel driver, the second set of current sources being equivalent to the first set of current sources and the second subset of current sources being distinct from the first subset of current sources.

15. The method of claim 14, wherein current produced by each activated current source of the first subset of current sources is combined to drive the first pixel.

16. The method of claim 14, wherein the first pixel is driven by activating, by a set of masks associated with the first set of current sources and based on the first entry, the first subset of current sources without activating a remainder of the first set of current sources.

17. The method of claim 12, wherein the memory includes a reconfigurable lookup table into which the first entry and the second entry are entered based on calibration performed subsequent to a manufacture of a display system performing the method.

18. A method comprising:

writing a set of pixel performance data entries to a lookup table stored in a memory, the set of pixel performance data entries including:

a first entry associated with a first brightness efficiency level of a first pixel, the first brightness efficiency level determined based on a first pixel efficiency characterization of the first pixel and a first characteristic of a first optical device associated with the first pixel, and a second entry associated with a second brightness efficiency level of a second pixel, the second brightness efficiency level higher than the first brightness efficiency level and determined based on a second pixel efficiency characterization of the second pixel and a second characteristic of a second optical device associated with the second pixel;

driving, based on the first entry of the lookup table and using a first pixel driver, the first pixel at a first drive strength selected, from a first plurality of drive strengths available to the first pixel driver, by activating a first subset of current sources from a first set of current sources available to the first pixel driver; and driving, based on the second entry of the lookup table and using a second pixel driver, the second pixel at a second drive strength selected, from a second plurality of drive strengths available to the second pixel driver, by activating a second subset of current sources from a second set of current sources available to the second pixel driver, the second drive strength lower than the first drive strength.

19. The method of claim 18, wherein the first pixel driver drives the first pixel in accordance with a binary pulse-width modulation signal associated with the first pixel, such that an apparent brightness of the first pixel during a time period is determined by both the first drive strength and the binary pulse-width modulation signal.

20. The method of claim 18, wherein current produced by each activated current source of the first subset of current sources is combined to drive the first pixel.

* * * * *